United States Patent
Shirakawa

(10) Patent No.: US 10,998,978 B1
(45) Date of Patent: May 4, 2021

(54) OPTICAL TRANSMISSION APPARATUS AND BIAS CONTROL METHOD

(71) Applicant: FUJITSU OPTICAL COMPONENTS LIMITED, Kawasaki (JP)

(72) Inventor: Iori Shirakawa, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/077,336

(22) Filed: Oct. 22, 2020

(30) Foreign Application Priority Data

Nov. 6, 2019 (JP) .............................. JP2019-201634

(51) Int. Cl.
*H04B 10/04* (2006.01)
*H04B 10/50* (2013.01)
*G02F 1/01* (2006.01)
*H04B 10/516* (2013.01)

(52) U.S. Cl.
CPC ..... *H04B 10/50575* (2013.01); *G02F 1/0123* (2013.01); *H04B 10/5051* (2013.01); *H04B 10/5165* (2013.01)

(58) Field of Classification Search
CPC ............ H04B 10/516; H04B 10/50575; H04B 10/50577; H04B 10/50595; H04B 10/5561; H04B 10/564; H04B 10/40; H04B 10/50572; H04B 10/548; H04B 10/541;
(Continued)

(56) References Cited

U.S. PATENT DOCUMENTS

| | | | |
|---|---|---|---|
| 7,023,534 B2 | 4/2006 | Lee et al. | |
| 8,145,069 B2* | 3/2012 | Tanaka | H04B 10/505 398/198 |
| 2008/0219678 A1 | 9/2008 | Doi | |

(Continued)

FOREIGN PATENT DOCUMENTS

| | | |
|---|---|---|
| JP | 2007-133176 A | 5/2007 |
| JP | 2008-39929 A | 2/2008 |

(Continued)

OTHER PUBLICATIONS

Hiroto Kawakami; Auto bias control technique for optical 16-QAM transmitter with asymmetric bias dithering, Optics Express, vol. 19, No. 26, Dec. 12, 2011, pp. B308-B312.

*Primary Examiner* — Hanh Phan
(74) *Attorney, Agent, or Firm* — Staas & Halsey LLP

(57) ABSTRACT

An optical transmission apparatus includes a modulation unit that generates modulated light by modulating light while bias on which a low-frequency signal is superimposed is applied thereto; an optical amplification unit that generates amplified light by amplifying the modulated light while holding an intensity of the amplified light at a changeable target value; an optical detection unit that generates an electric signal by performing photoelectric conversion on a part of the amplified light; an amplification unit that amplifies the electric signal while suppressing variation in the amplified electric signal, the variation being due to a change of the target value; and a control unit that detects a low-frequency component from the amplified electric signal the variation of which is suppressed and controls the bias on a basis of the detected low-frequency component, the low-frequency component being generated by the low-frequency signal.

8 Claims, 19 Drawing Sheets

(58) Field of Classification Search
CPC . H04B 10/5057; G02F 1/0123; G02F 1/2257;
G02F 1/2255
USPC ....... 398/183, 188, 184, 185, 192, 193, 194,
398/195, 196, 197, 198, 199, 201, 158,
398/159, 33, 38, 136, 137, 138; 359/237,
359/238, 239, 245, 248, 279
See application file for complete search history.

(56) References Cited

U.S. PATENT DOCUMENTS

| | | |
|---|---|---|
| 2012/0155865 A1 | 6/2012 | Kawakami et al. |
| 2012/0155880 A1* | 6/2012 | Nishimoto ....... H04B 10/50572 398/79 |
| 2012/0288284 A1 | 11/2012 | Yoshida et al. |
| 2014/0010530 A1* | 1/2014 | Goebuchi ............... H04J 14/06 398/25 |
| 2014/0334829 A1 | 11/2014 | Akiyama |
| 2018/0088359 A1 | 3/2018 | Shirakawa |

FOREIGN PATENT DOCUMENTS

| | | |
|---|---|---|
| JP | 2013-88702 A | 5/2013 |
| JP | 2018-54907 A | 4/2018 |
| WO | 2011/030763 A1 | 3/2011 |
| WO | 2011/104838 A1 | 9/2011 |
| WO | 2013/114628 A1 | 8/2013 |

\* cited by examiner

| BIAS CURRENT (mA) | OPTICAL AMPLIFICATION FACTOR (dB) |
|---|---|
| 100 | 10 |
| 200 | 13 |
| ⋮ | ⋮ |
| 1000 | 20 |

OPTICAL TRANSMISSION APPARATUS AND BIAS CONTROL METHOD

CROSS-REFERENCE TO RELATED APPLICATION

This application is based upon and claims the benefit of priority of the prior Japanese Patent Application No. 2019-201634, filed on Nov. 6, 2019, the entire contents of which are incorporated herein by reference.

FIELD

The embodiments discussed herein are related to an optical transmission apparatus and a bias control method.

BACKGROUND

In optical communication at or above 10 Gbps, a Mach-Zender modulator (referred to hereafter as an MZ modulator) is used. An MZ modulator is a modulator for modulating the intensity of input light in response to a drive signal superimposed on a bias voltage.

An MZ modulator varies the intensity of output light in accordance with the magnitude of the voltage applied thereto. However, even when a voltage of the same magnitude is applied, the intensity of the output light varies with temperature variation and the passage of time. Therefore, even when the bias voltage and the drive signal remain the same, the intensity of the output light from the Mach-Zender modulator varies with temperature variation and the passage of time.

In response to this problem, techniques for controlling the bias voltage in accordance with a change of the relationship between the applied voltage and the intensity of the output light have been proposed (see Japanese Laid-open Patent Publication No. 2007-133176, Japanese Laid-open Patent Publication No. 2013-88702, International Publication Pamphlet No. WO 2013/114628, International Publication Pamphlet No. WO 2011/104838, International Publication Pamphlet No. WO 2011/030763, and Japanese Laid-open Patent Publication No. 2018-54907, and Hiroto Kawakami, "Auto bias control technique for optical 16-QAM transmitter with asymmetric bias dithering," OPTICS EXPRESS, Vol. 19, No. 26, p. B308-6312, December 2001). The relationship between the applied voltage and the intensity of the output light is referred to hereafter as the optical output characteristic.

In these techniques, for example, a low-frequency AC signal (referred to hereafter as a "dither signal") is superimposed on a DC voltage (in other words, a bias voltage). Then, modulated light (i.e., light that is modulated) is generated by applying the DC voltage to an MZ modulator and inputting a drive signal into the MZ modulator, the dither signal being superimposed on the DC voltage. Further, an electric signal is generated by performing photoelectric conversion on the modulated light. By detecting a low-frequency component, which oscillates at the frequency of the dither signal, from the generated electric signal and feeding the detected low-frequency component back to a bias voltage generation circuit, the bias voltage is controlled to an appropriate value.

This control enables to suppress the variation in the modulation characteristic (more specifically, the relationship between the intensity of the drive signal and the intensity of the modulated light, and the relationship between the intensity of the drive signal and phase of the modulated light), the variation in the modulation characteristic being caused by drift in the optical output characteristic (in other words, optical output variation due to temperature variation and the passage of time).

Optical communication at or above 100 GHz is realized by multi-valued modulated light or modulated light with a bandwidth limited by a Nyquist filter or the like. These types of modulated light are also generated by an MZ modulator with a controlled bias voltage. When modulated light is subjected to multi-value processing or bandwidth limitation, the modulated light generated by the MZ modulator or the like is reduced in intensity.

SUMMARY

According to an aspect of the embodiments, an optical transmission apparatus includes a modulation unit configured to generate modulated light by modulating light while at least one bias on which a low-frequency signal is superimposed is applied to the modulation unit; an optical amplification unit configured to generate amplified light by amplifying the modulated light while holding an intensity of the amplified light at a target value, the target value being changeable; an optical detection unit configured to generate an electric signal by performing photoelectric conversion on a part of the amplified light; an amplification unit configured to amplify the electric signal while suppressing variation in the amplified electric signal by controlling the amplifying of the electric signal, the variation in the amplified electric signal being due to a change of the target value; and a control unit configured to detect a low-frequency component from the amplified electric signal the variation of which is suppressed and control the at least one bias on a basis of the detected low-frequency component, the low-frequency component being generated by the low-frequency signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a view depicting an example of a lookup table 224 used in the processing of the correction unit 46;

DESCRIPTION OF EMBODIMENTS

As described previously, bias voltage control is executed in an MZ modulator on the basis of the electric signal that is acquired by performing photoelectric conversion on a part of the modulated light. As a result of this photoelectric conversion, a part of the modulated light is lost.

When a modulated light is reduced in intensity by bandwidth limitation or multi-value processing and a part of the modulated light is subjected to photoelectric conversion for the purpose of bias control, the reduced modulated light becomes even weaker. As a result, the quality (for example, the signal-to-noise ratio) of a transmission signal generated from the modulated light deteriorates, the transmission signal being a signal acquired by amplifying the modulated light, for example.

Preferred embodiments will be explained with reference to accompanying drawings. Here, identical symbols are given to corresponding parts even in different drawings, and the description thereof will be omitted.

First Embodiment

(1) Structure

Figure 1:
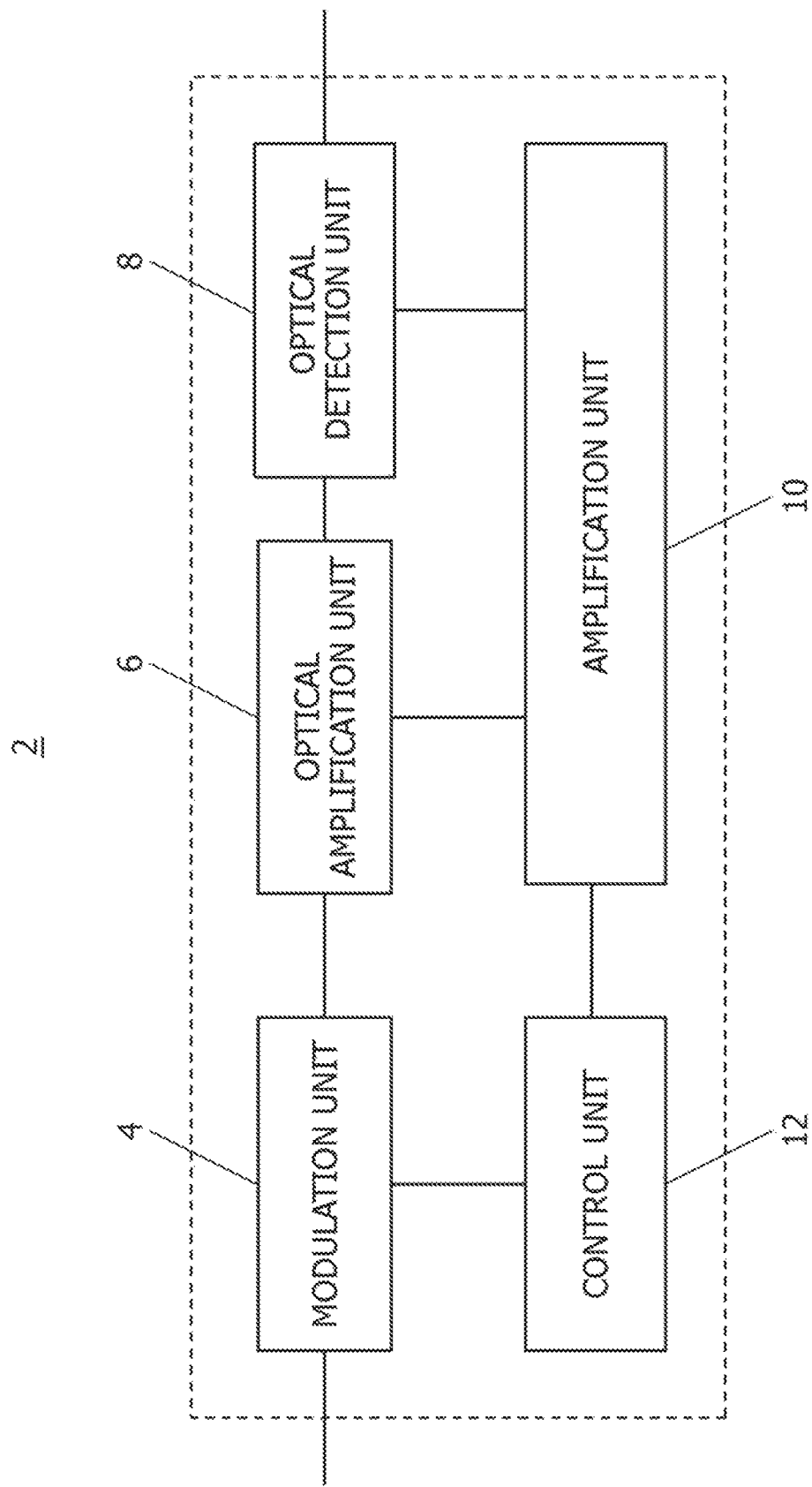
FIG. 1 depicts an example of function blocks of an optical transmission apparatus 2 according to a first embodiment.

FIG. 1 depicts an example of function blocks of an optical transmission apparatus 2 according to a first embodiment. As illustrated in FIG. 1, the optical transmission apparatus 2 includes a modulation unit 4, an optical amplification unit 6, and an optical detection unit 8. The optical transmission apparatus 2 also includes an amplification unit 10 and a control unit 12. The hardware configuration of the optical transmission apparatus 2 will be described in a second embodiment (see FIG. 4). The modulation unit 4 is a device including at least one modulator (a MZ modulator, for example).

(2) Operation

Figure 2:
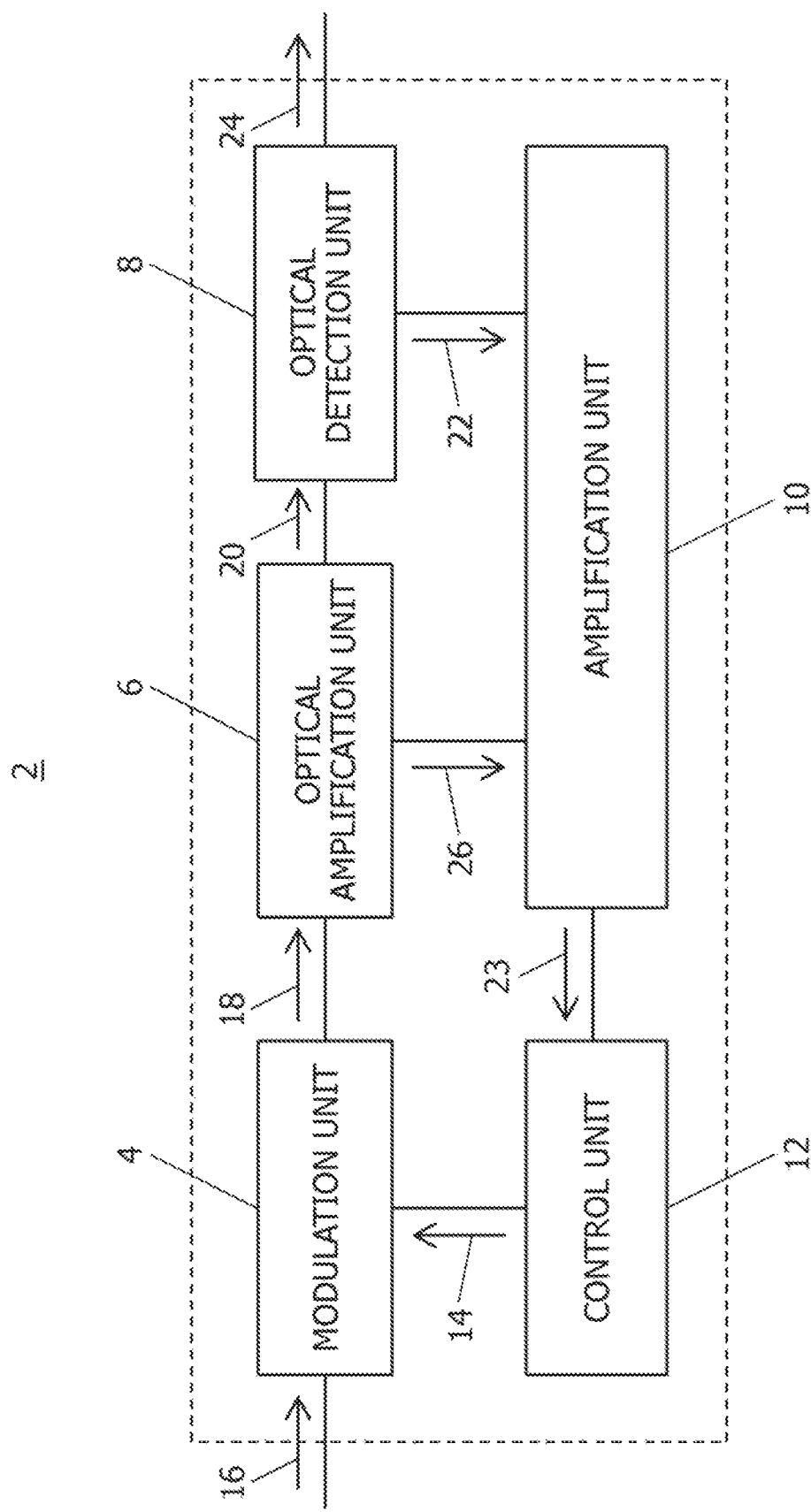
FIG. 2 is a view illustrating an operation of the optical transmission apparatus 2.

FIG. 2 is a view illustrating an operation of the optical transmission apparatus 2. The modulation unit 4 generates modulated light 18 (i.e., light that is modulated) by modulating light 16 (for example, continuous light with a fixed intensity) in response to a drive signal while a bias 14 (a DC voltage, for example), on which a low-frequency signal (in other words, a dither signal) is superimposed, is applied to the modulation unit 4.

The optical amplification unit 6 generates amplified light 20 (i.e., modulated light that is amplified) by amplifying the modulated light 18, while holding the intensity of the amplified light 20 at a target value that is changeable. The optical detection unit 8 generates an electric signal 22 by performing photoelectric conversion on a part of the amplified light 20. The remaining part of the amplified light 20 (i.e., a transmission signal 24) is output from the optical transmission apparatus 2. The transmission signal 24 is an optical signal used in digital coherent communication, for example.

The amplification unit 10 amplifies the electric signal 22 while suppressing variation (more specifically, intensity variation) that occurs in the amplified electric signal (referred to hereafter as an amplified signal 23) when the target value for the intensity of the amplified light 20 is changed. For example, the amplification unit 10 controls an amplification factor applied to the electric signal 22 on the basis of information 26 (for example, an optical amplification factor) acquired from the optical amplification unit 6. By controlling amplification of the electric signal 22 in this manner, the amplification unit 10 outputs the amplified signal 23 (referred to hereafter as a corrected signal 23) in which variation thereof is suppressed, the variation is due to change of the target value for the intensity of the amplified light 20.

The control unit 12 detects a low-frequency component from the corrected signal 23 and controls the bias of the modulation unit 4 on the basis of the detected low-frequency component. The low-frequency component, which is a component of the corrected signal 23, is generated by the low-frequency signal (i.e. the signal superimposed on the bias 14 of the modulation unit 4).

(3) Bias Control Method

Figure 3:
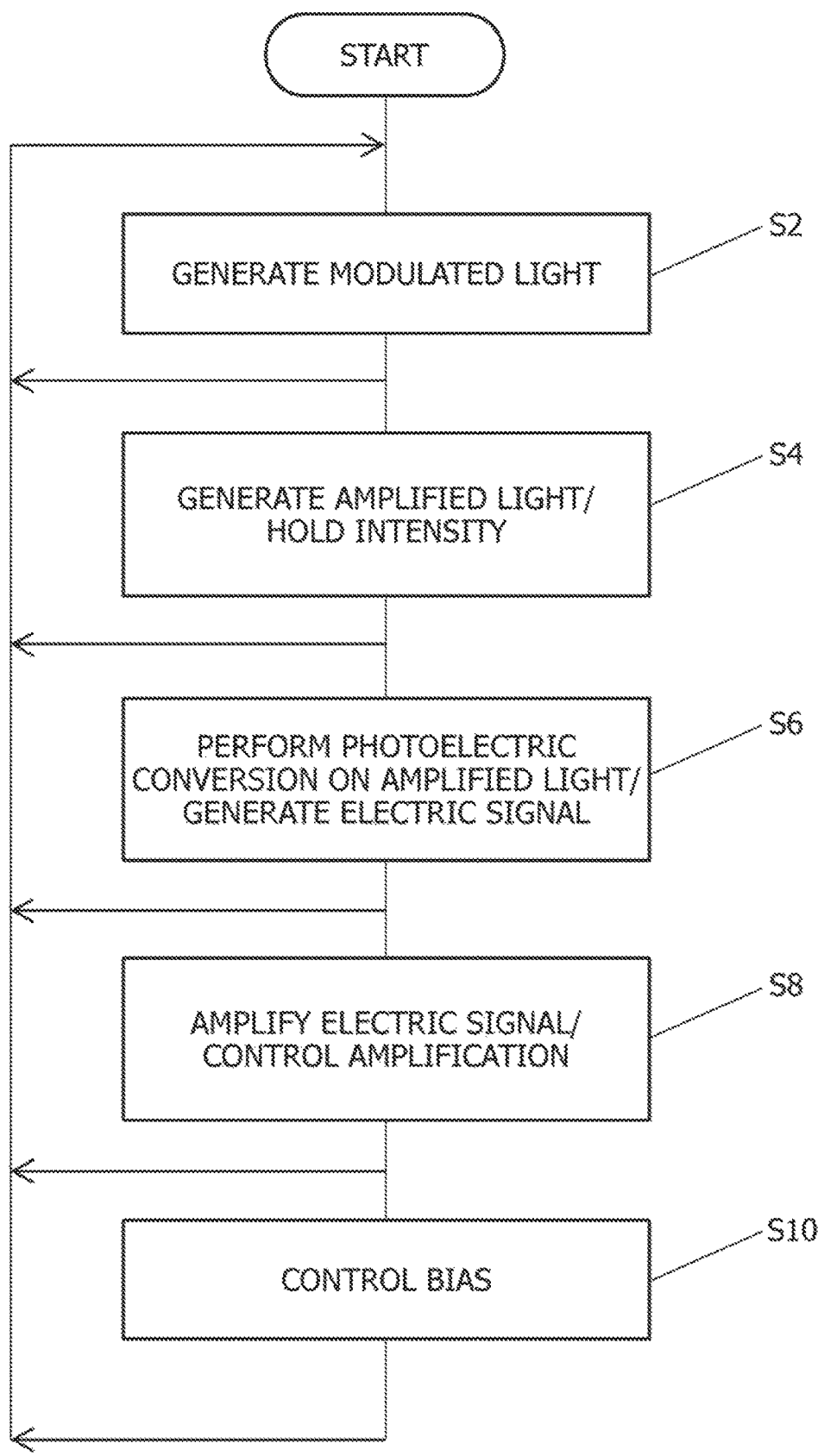
FIG. 3 is a view illustrating a bias control method according to the first embodiment.

FIG. 3 is a view illustrating a bias control method according to the first embodiment.

The optical transmission apparatus 2 generates the modulated light 18 by modulating the light 16 using a modulator to which the bias 14, on which the low-frequency signal is superimposed, is applied (step S2). The modulator is included in the modulation unit 4 of FIG. 1, for example.

Further, the optical transmission apparatus 2 generates the amplified light 20 by amplifying the modulated light 18 while holding the intensity of the amplified light 20 at a target value that is changeable (step S4).

Further, the optical transmission apparatus 2 generates the electric signal 22 by performing photoelectric conversion on a part of the amplified light 20 (step S6).

Further, while amplifying the electric signal 22, the optical transmission apparatus 2 suppress variation occurring in the amplified signal 23 (i.e., the amplified electric signal 22) by controlling the amplification factor or the like (step S8). Here, the variation in the amplified signal 23 is due to the change of the target value for the intensity of the amplified light 20. For example, the variation in the amplified signal 23, which is due to change of the target value for the intensity of the amplified light 20, is suppressed by controlling the amplification factor of the electric signal 22 on the basis of the optical gain (i.e., the optical amplification factor) of the modulated light 18 generated in step S4.

Further, the optical transmission apparatus 2 detects the low-frequency component from the amplified signal 23 (i.e., the corrected signal 23) the variation of which is suppressed. The low-frequency component is generated by the low-frequency signal (i.e., the signal superimposed on the bias of the modulator). Then, the optical transmission apparatus 2 controls the bias of the modulator on the basis of the detected low-frequency component (step S10).

Once started, steps S2 to S10 are continued and executed in parallel with steps started thereafter. As a result, the transmission signal 24 is generated so as to include a plurality of symbols. The medium that executes the method illustrated in FIG. 3 is not limited to the optical transmission apparatus 2 of FIG. 1. For example, the method illustrated in FIG. 3 may be executed by a device acquired by adding an optical reception unit to the optical transmission apparatus 2 of FIG. 1 (in other words, an optical transmission apparatus having an optical reception function).

(4) Bias Control Based on Modulated Light

In the example described with reference to FIG. 2, the bias of the modulation unit 4 is controlled on the basis of the amplified modulated light (in other words, the amplified light 20). However, the bias may also be controlled on the basis of the modulated light 18 prior to amplification. In this case, the optical detection unit 8 is disposed between the modulation unit 4 and the optical amplification unit 6, and the amplification factor of the amplification unit 10 is fixed.

Optical signals used for optical communication are generated using a modulator in which the bias is controlled to a high degree of precision. High-precision bias control is realized using a feedback signal (the electric signal acquired by performing photoelectric conversion on a part of the modulated light, for example) with at least a certain intensity (for example, several tens of μV).

When the intensity of the modulated light 18 is high, a sufficiently strong feedback signal can be generated merely by performing photoelectric conversion on a small part of the modulated light 18. However, when the modulated light 18 is weakened by bandwidth limitation and multi-value processing, high-precision bias control can only be realized by performing photoelectric conversion on a large part of the modulated light 18.

When photoelectric conversion is performed on a large part of the modulated light 18, the modulated light 18 (for example, light of approximately −15 dBm) weakened by bandwidth limitation or multi-value processing becomes even weaker. Even with this weakened modulated light, as long as the modulated light is amplified by a high gain (i.e., high optical amplification factor), the modulated light can be converted into an optical signal (for example, light of approximately 0 dBm) with a suitable intensity for optical communication. However, when weak modulated light is amplified by a high gain, the signal-to-noise ratio of the weak modulated light deteriorates by the amplification. As a result, the quality of the transmission signal generated from the modulated light 18 (in other words, the output light of the optical transmission apparatus) deteriorates.

It is thought that this problem can be solved by generating a feedback signal from the amplified light 20 (i.e., the amplified modulated light). In this case, the optical detection unit 8 is disposed after the optical amplification unit 6, and the amplification factor of the amplification unit 10 is fixed.

However, even with this solution, the transmission signal inevitably deteriorates. The optical transmission apparatus holds the intensity of the output light (i.e., the transmission signal) at a certain value, but this value is changed as appropriate. The intensity of the transmission signal is changed by changing the intensity of the amplified light 20 (i.e., the amplified modulated light). This intensity change is realized by changing the target value for the intensity of the amplified light 20.

When the intensity of the amplified light 20 is changed, the intensity of the electric signal 22, which is generated from the amplified light 20, changes. Accordingly, the output of the amplification unit 10 changes, thereby impeding the smooth execution of bias control on the modulation unit 4. As a result, the quality of the transmission signal deteriorates (see second embodiment).

The optical transmission apparatus 2 of the first embodiment suppresses an increase in the signal-to-noise ratio of the transmission signal 24 by performing photoelectric conversion on the amplified light 20 in order to generate a feedback signal (here, the electric signal 22). Further, the optical transmission apparatus 2 of the first embodiment suppresses variation in the output of the amplification unit 10 (i.e., the corrected signal 23), which is due to change of the intensity of the amplified light 20, by controlling the amplification factor of the amplification unit 10, for example.

Hence, even when the intensity of the transmission signal 24 is changed, almost no variation occurs in the output of the amplification unit 10 (i.e., the corrected signal 23). Accordingly, the transmission signal 24 does not deteriorate. In other words, according to the optical transmission apparatus 2 of the first embodiment, deterioration of the transmission signal due to bias control for the modulation unit 4 can be prevented.

As already mentioned above, deterioration of the transmission signal due to the bias control becomes more apparent when the modulated light 18 is weakened by multi-value processing and spectrum narrowing of the transmission signal. In highly multi-valued light modulation (for example, 64-Quadrature Amplitude Modulation), the amplitude of the low-frequency signal superimposed on the bias voltage is reduced to accommodate the narrow symbol intervals. As a result, deterioration of the transmission signal due to the bias control becomes more serious.

In the example described above, the bias 4 is one voltage applied to a MZ modulator included in the modulation unit 4, for example. However, a plurality of biases may be applied to the modulation unit 4 (see following embodiments).

According to the optical transmission apparatus 2 of the first embodiment, deterioration of the transmission signal due to the bias control can be prevented, and therefore the problems described above can be solved.

Second Embodiment

The second embodiment is similar to the first embodiment. Therefore, description of configurations and so on that are identical to the first embodiment will be either omitted or simplified.

(1) Structure

Figure 4:
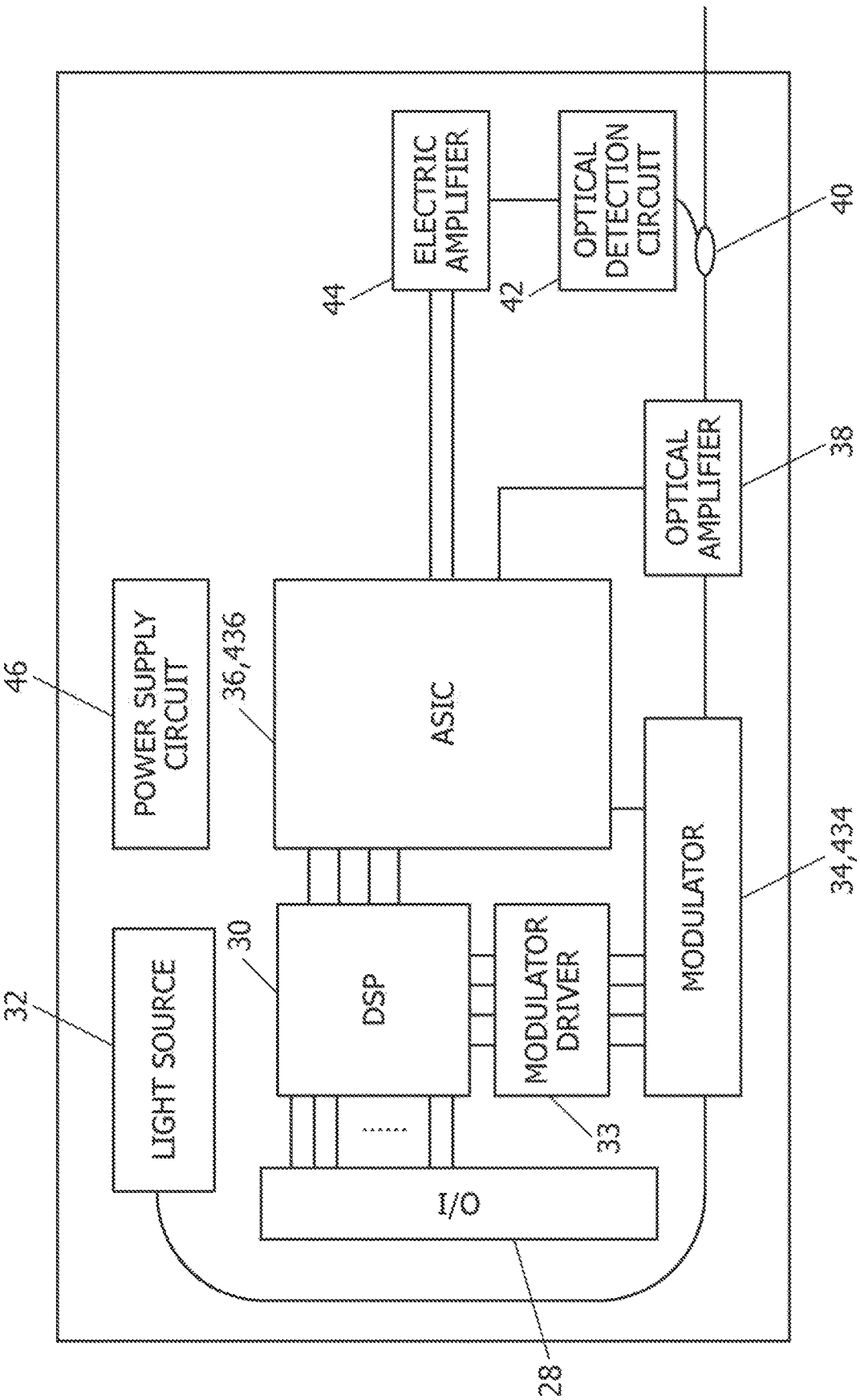
FIG. 4 is a view depicting an example of the hardware configuration of an optical transmission apparatus 202 according to the second embodiment.

FIG. 4 is a view depicting an example of the hardware configuration of an optical transmission apparatus 202 according to the second embodiment. The optical transmission apparatus 202 according to the second embodiment includes an input/output (I/O) connector 28, a digital signal processor (DSP) 30, and a light source 32. The optical transmission apparatus 202 also includes a modulator driver 33, a modulator 34, an application specific integrated circuit (ASIC) 36, and an optical amplifier 38. The optical transmission apparatus 202 further includes an optical splitter 40, an optical detection circuit 42, an electric amplifier 44, and a power supply unit 46. The optical transmission apparatus 202 may include a central processing unit (CPU) and memories coupled to a CPU instead of the ASIC. The CPU is configured to execute a program recorded in the memories, for example. The memories are a dynamic random access memory (DRAM) and a nonvolatile memory in which the program executed by the CPU is recorded, for example. The program recorded in the memories is a program for realizing processing executed by units to be described below (for example, a current control unit, a correction unit, a bias control unit, and an optical amplification unit), for example.

The I/O connector 28 connects a circuit on the exterior of the optical transmission apparatus 202 to a circuit packaged in the optical transmission apparatus 202. As a result of this connection, transmission data and control data are led to the DSP 30 and so on through the I/O connector 28.

The DSP 30 generates a transmission symbol string from the transmission data in accordance with a specified modulation method. Each symbol included in the transmission symbol string includes I component data and Q component data. The I component data are data representing a component having the same phase as the carrier wave (in other words, an In-Phase component), for example. The Q component data are data representing a component that is orthogonal to the In-Phase component (a Quadrature Phase component), for example.

For example, the light source 32 includes a distributed feedback laser and a drive power supply therefor. The light source 32 generates light (continuous light, for example) and supplies the generated light to the modulator 34. The modulator driver 33 generates a set of drive signals (a drive signal I and a drive signal Q) from the I component data and the Q component data generated by the DSP 30.

The modulator 34 generates modulated light by modulating the light output from the light source 32 according to the drive signal I and the drive signal Q. In other words, the modulator 34 of the second embodiment is an I/Q modulator. For example, the modulator 34 is an LN modulator formed on an $LiNbO_3$ substrate. The modulator 34 may be a semiconductor optical modulator formed from InP or silicon.

The ASIC 36 controls the modulator 34, the optical amplifier 38, and the electric amplifier 44. For example, the ASIC 36 controls a bias voltage of the modulator 34. The ASIC 36 may also control another circuit or element packaged in the optical transmission apparatus 202.

The optical amplifier 38 amplifies the modulated light generated by the modulator 34. For example, the optical amplifier 38 includes an optical fiber amplifier (for example, an optical fiber doped with erbium) and an excitation light source therefor. The optical amplifier 38 also includes a current source for the excitation light source. The optical amplifier 38 may also be a device including a semiconductor optical amplifier and a current source for the semiconductor optical amplifier.

The optical splitter 40 separates a part of the modulated light amplified by the optical amplifier 38 (in other words, amplified light) and supplies the separated part to the optical detection circuit 42. The optical splitter 40 is a fiber coupler, for example. The splitting ratio is 0.01 to 0.1, for example.

The optical detection circuit 42 generates an electric signal by performing photoelectric conversion on the light from the optical splitter 40 (a part of the modulated light). For example, the optical detection circuit 42 includes a photodiode and a drive circuit therefor. The optical detection circuit 42 also includes a current-voltage conversion circuit that generates an electric signal by converting an output current of the photodiode into a voltage. The electric signal may be either an analog signal or a digital signal.

The electric amplifier (electric circuit) 44 amplifies the electric signal (a voltage, for example) generated by the optical detection circuit 42. The amplification factor of the electric amplifier 44 is controlled by the ASIC 36. The power supply circuit 46 supplies power to the circuits and elements packaged in the optical transmission apparatus 202.

Figure 5:
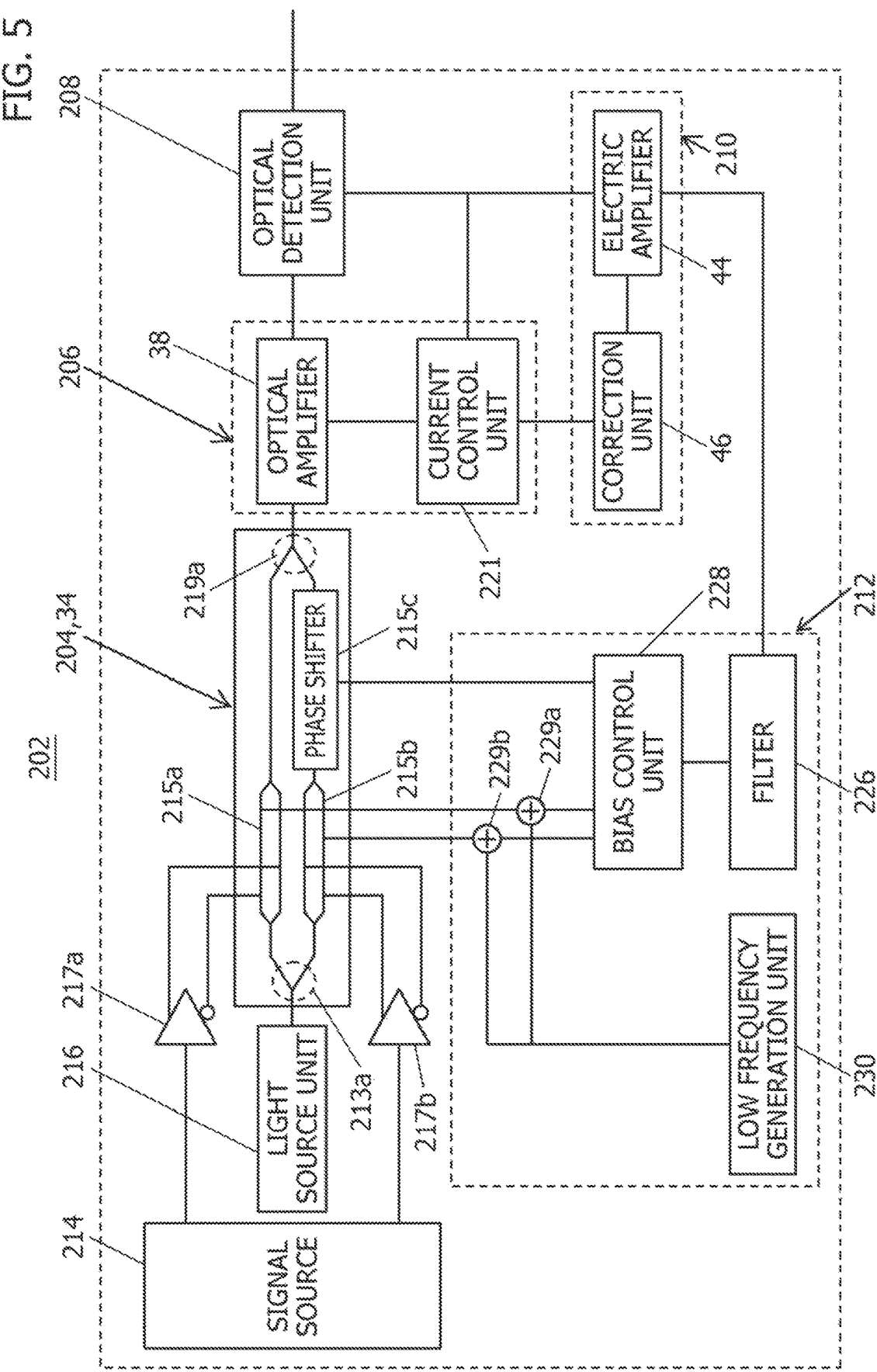
FIG. 5 depicts an example of function blocks of the optical transmission apparatus 202 according to the second embodiment.

FIG. 5 depicts an example of function blocks of the optical transmission apparatus 202 according to the second embodiment. As illustrated in FIG. 5, the optical transmission apparatus 202 includes a light source unit 216 and a modulation unit 204. The modulation unit 204 is an example of the modulation unit 4 of the first embodiment.

The optical transmission apparatus 202 further includes an optical amplification unit 206 and an optical detection unit 208. The optical amplification unit 206 is an example of the optical amplification unit 6 of the first embodiment. The optical detection unit 208 is an example of the optical detection unit 8 of the first embodiment.

The optical transmission apparatus 202 further includes an amplification unit 210 and a control unit 212. The amplification unit 210 is an example of the amplification unit 10 of the first embodiment. The control unit 212 is an example of the control unit 12 of the first embodiment.

The optical transmission apparatus 202 further includes a signal source 214. The signal source 214 and the light source unit 216 may be omitted. In this case, signals generated by the signal source 214 and light generated by the light source unit 216 are supplied from the exterior of the optical transmission apparatus 202, for example. The optical transmission apparatus 202 further includes a driver 217a and a driver 217b.

(2) Operation

Figure 6:
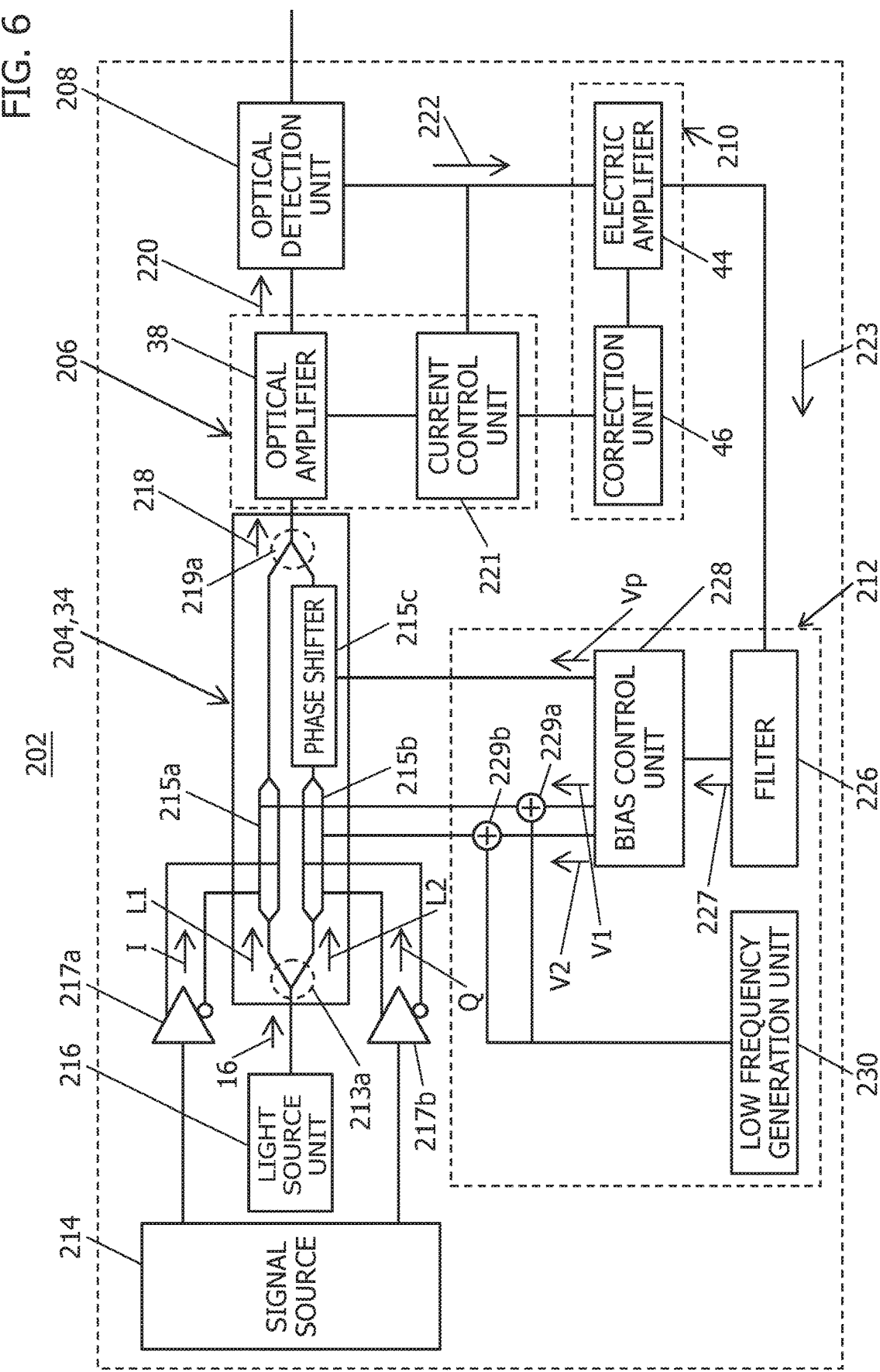
FIG. 6 is a view illustrating an operation of the optical transmission apparatus 202.

FIG. 6 is a view illustrating an operation of the optical transmission apparatus 202.

Light Source Unit

The light source unit 216 outputs light 16 (continuous light, for example). The light source unit 216 is realized by the light source 32 (see FIG. 4).

Signal Source

The signal source 214 generates I component data and Q component data from the transmission data in accordance with a specified modulation method. The signal source 214 is realized by the DSP 30.

Driver

The driver 217a generates the drive signal I from the I component data. The driver 217b generates the drive signal Q from the Q component data. The drive signal I and the drive signal Q are respectively differential signals. The drive signal I and the drive signal Q may be single signals. The driver 217a and the driver 217b are realized by the modulator driver 33 illustrated in FIG. 4, for example.

Modulation Unit

The modulation unit 204 is realized by the modulator 34. This applies likewise to a modulation unit 404 according to a third embodiment, to be described below.

For example, the modulator 34 (see FIG. 5) includes a first dividing unit 213a, a first Mach-Zender modulator 215a, and a second Mach-Zender modulator 215b. The modulator 34 also includes a first multiplexing unit 219a and a phase shifting unit 215c. The first dividing unit 213a and the first multiplexing unit 219a are Y-branch waveguides, for example. The modulator 34 is a Mach-Zender modulator.

The first dividing unit 213a generates first light L1 and second light L2 by dividing the light 16 output from the light source unit 216. The first Mach-Zender modulator 215a generates first modulated light by modulating the first light L1 using the drive signal I while a first bias voltage V1 on which a low-frequency signal is superimposed is applied to the first Mach-Zender modulator 215a. The second Mach-Zender modulator 215b generates second modulated light by modulating the second light L2 using the drive signal Q while a second bias voltage V2 on which the low-frequency signal is superimposed is applied to the second Mach-Zender modulator 215b. The first bias voltage V1 and the second bias voltage V2 are DC voltages, for example. For example, the bias 14 (see FIG. 2) of the first embodiment includes the first bias voltage V1 on which the low-frequency signal is superimposed and the second bias voltage V2 on which the low-frequency signal is superimposed.

The phase shifting unit 215c applies a phase difference between the first modulated light and the second modulated light by varying the phase of the second modulated light by a certain amount. The applied phase difference is $\pi/2+n\pi$ (where n is an integer including zero), for example. For example, the phase shifting unit 215c includes an optical waveguide for guiding the second modulated light and electrodes formed near the optical waveguide. The phase shifting unit 215c varies the phase of the second modulated light using a bias voltage (for example, a DC voltage) Vp applied to the electrodes.

The first multiplexing unit 219a generates modulated light 218 by multiplexing the first modulated light and the second modulated light to which the phase difference is applied. The modulated light 218 is light modulated by quadrature phase shift keying (QPSK).

Optical Amplification Unit

The optical amplification unit 206 includes the optical amplifier 38 (see FIGS. 4 and 6) and a current control unit 221. The current control unit 221 is realized by the ASIC 36. This applies likewise to a current control unit 421 according to the third embodiment, to be described below. The optical amplifier 38 generates amplified light 220 by amplifying the modulated light 218.

The current control unit 221 acquires the target value from data received from an external circuit, and transmits the acquired target value to the current source (the current source of the excitation light source) included in the optical amplifier 38. Further, the current control unit 221 detects the intensity of an electric signal 222 generated by the optical detection unit 208 and transmits the detected intensity (referred to hereafter as intensity information) to the current source of the optical amplifier 38.

The optical amplifier 38, while generating the amplified light 220 by amplifying the modulated light 218, holds the intensity of the amplified light 220 at the target value on the basis of information (more specifically, the target value and the intensity information) from the current control unit 221. The optical amplifier 38 holds the intensity of the amplified light 220 at the target value by automatic power control (APC), for example.

More specifically, after receiving the target value and the intensity information (i.e., the intensity of the electric signal 222) from the current control unit 221, the current source holds the intensity of the amplified light 220 at the target value by controlling the current (referred to hereafter as a bias current) to be supplied to the excitation light source of the optical amplifier 38.

Figure 7:
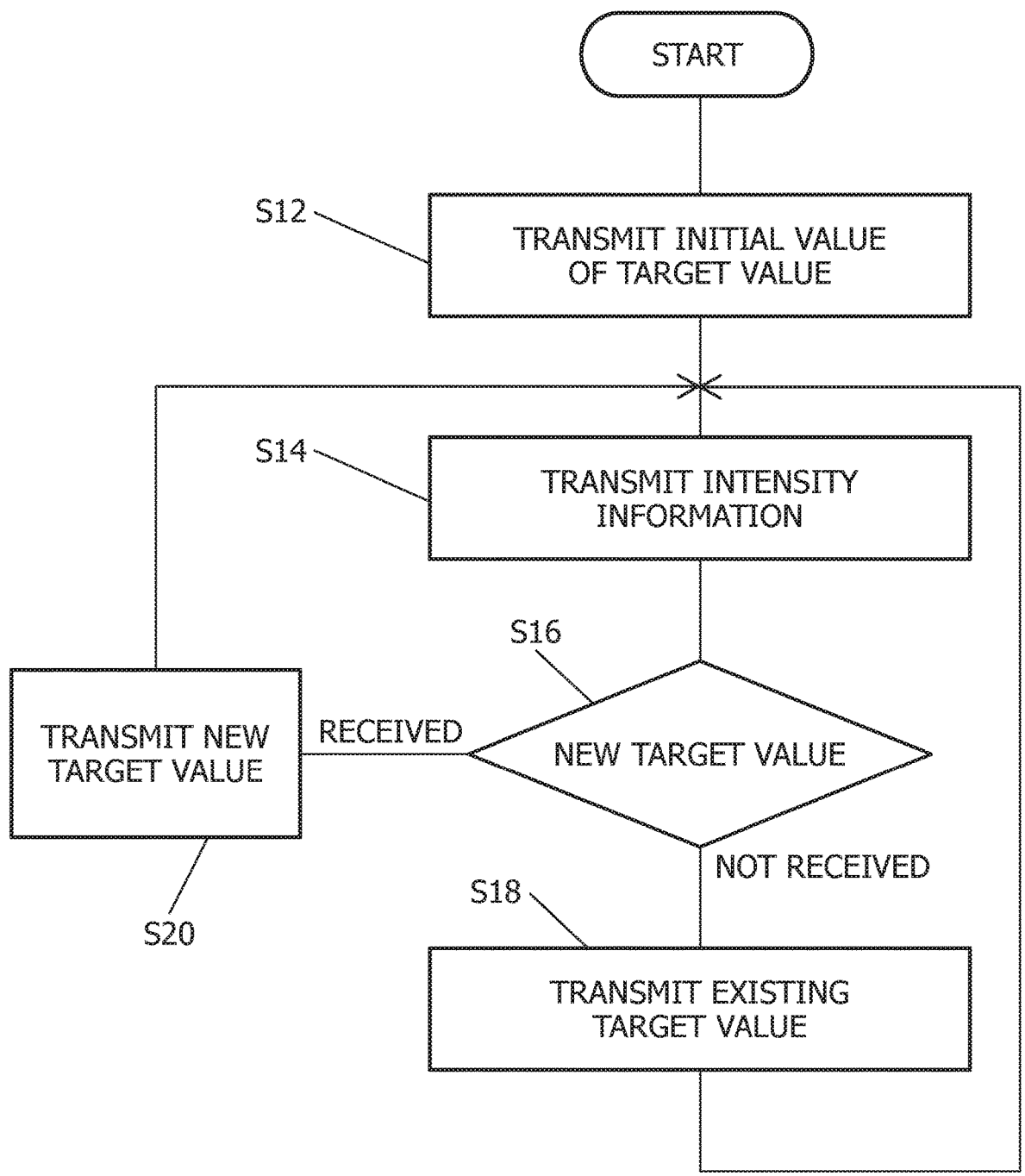
FIG. 7 is a view depicting an example of the processing executed by the current control unit 221.

FIG. 7 is a view depicting an example of the processing executed by the current control unit 221. First, the current control unit 221 transmits an initial value (0 mW, for example) of the target value for the intensity of the amplified light 220 to the optical amplifier 38 (step S12).

Following step S12, the current control unit 221 detects the intensity of the electric signal 222 and transmits the detected intensity (in other words, the intensity information) to the optical amplifier 38 (step S14).

Following step S14, the current control unit 221 determines whether or not a new target value has been received from the outside, for example (step S16). When a new target value has not been received, the current control unit 221 transmits the existing target value (for example, the most recently received target value) to the optical amplifier 38 (step S18).

Following step S18, the current control unit 221 returns to step S14.

When a new target value has been received, the current control unit 221 transmits the new target value to the optical amplifier 38 (step S20). Following step S20, the current control unit 221 returns to step S14.

Optical Detection Unit

The optical detection unit 208 is realized by the optical splitter 40 (see FIG. 4) and the optical detection circuit 42. The optical detection unit 208 generates the electric signal 222 by performing photoelectric conversion on the light separated from the amplified light 220 by the optical splitter 40 (in other words, a part of the amplified light 220).

Amplification Unit

The amplification unit 210 includes the electric amplifier 44 (see FIGS. 4 and 6) and a correction unit 46. The correction unit 46 is realized by the ASIC 36. This applies likewise to a correction unit 446 according to the third embodiment.

The electric amplifier 44 amplifies the electric signal 222 (i.e., the output of the optical detection unit 208) so as to generate an amplified electric signal (referred to hereafter as the amplified signal 223). The correction unit 46 suppresses the variation that occurs in the intensity of the amplified signal 223 by controlling the amplification factor of the electric amplifier 44, for example. The variation occurs when the target value (more specifically, the target value for the intensity of the amplified light 220) is changed. The amplification unit 210 outputs the amplified signal 223 (referred to hereafter as a corrected signal 223) intensity variation of which is suppressed.

The electric signal 222 is a signal acquired by performing photoelectric conversion on a part of the amplified light 220, and therefore the electric signal 222 changes in accordance with the intensity of the amplified light 220. Hence, when the intensity of the amplified light 220 changes due to change of the target value, the intensity of the electric signal 222 changes together therewith. This type of signal is not suitable for use in bias control of a modulator. With the amplification unit 210 according to the second embodiment, however, it is possible to generate an amplified signal 223 (i.e., the corrected signal 223) that exhibits almost no intensity variation even when the intensity of the amplified light 220 changes.

Figure 8:
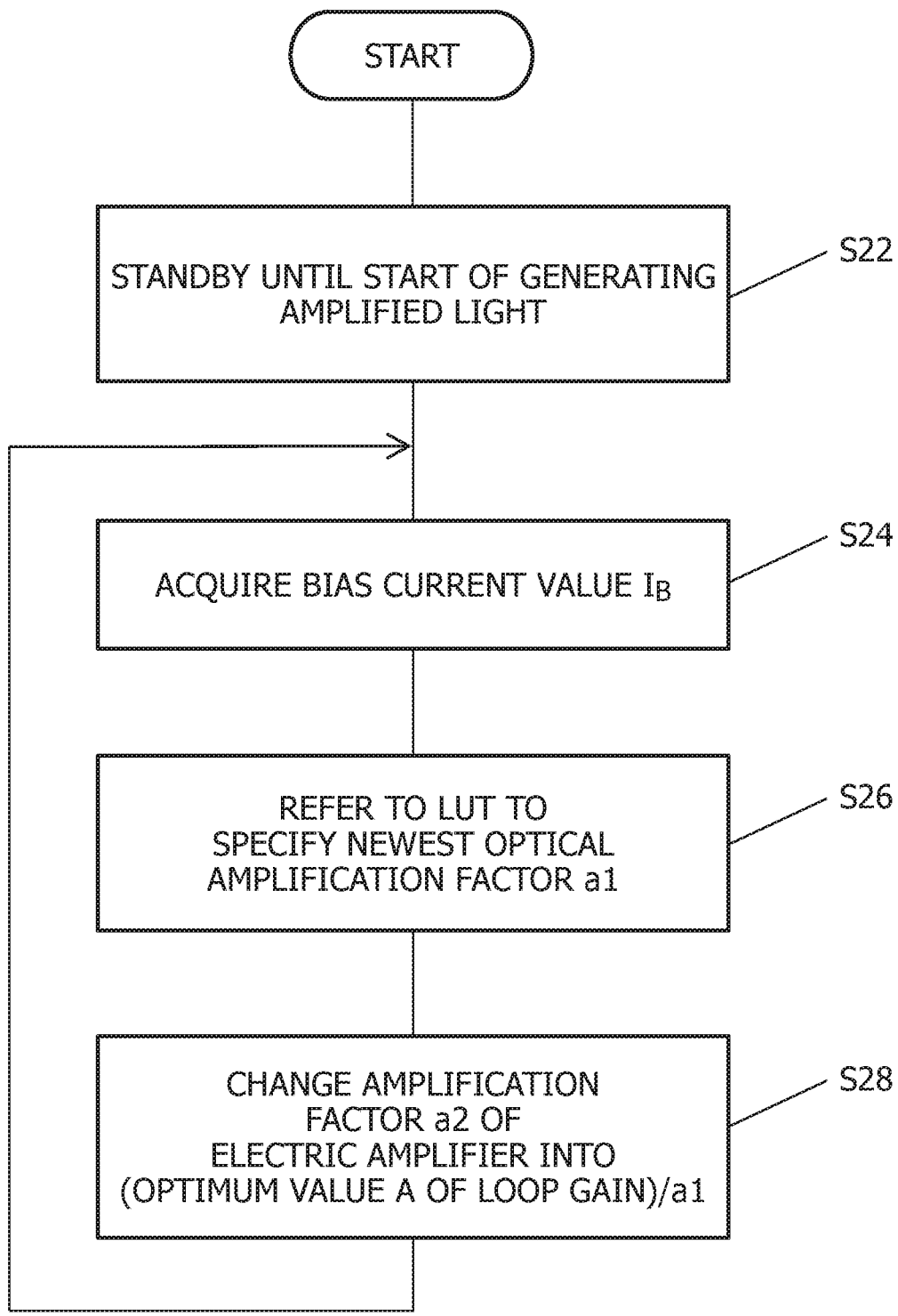
FIG. 8 is a view depicting an example of the processing executed by the correction unit 46.

FIG. 8 is a view depicting an example of the processing executed by the amplification unit 210 (more specifically, the correction unit 46). FIG. 9 is a view depicting an example of a lookup table 224 used in the processing of the amplification unit 210. The bias current of the optical amplifier 38 is recorded in a first column of the lookup table 224. The optical amplification factor of the optical amplifier 38 is recorded in a second column of the lookup table 224.

First, the amplification unit 210 standbys until the start of generating the amplified light 220 (step S22). Following step S22, the amplification unit 210 acquires the value of a bias current IB from the optical amplifier 38 (step S24). The value acquired here in step 24 is that of the bias current IB at the time when step S22 is executed.

Following step S24, the amplification unit 210 refers to the lookup table 224 (see FIG. 9) to specify an optical amplification factor a1 (10 dB, for example) corresponding to the newest current value (100 mA, for example) among the values of the bias current IB acquired in step S24 (step S26).

Following step S26, the amplification unit 210 sets an amplification factor a2 of the electric amplifier at A/a1 (a multiple of two, for example) (step S28). A is an optimum value of a loop gain to be described below. When the optimum value A is 15 dB and the optical amplification factor is 10 dB, the amplification factor a2 of the electric amplifier is set at 5 dB (=15 dB−10 dB).

The electric amplifier 44 generates the corrected signal 223 by amplifying the electric signal 222 at the changed amplification factor a2. Following step S28, the amplification unit 210 returns to step S24.

In the above example, the correction unit 46 controls the electric amplifier 44 on the basis of the bias current IB of the optical amplifier 38. However, the correction unit 46 may control the electric amplifier 44 on the basis of the intensity information (i.e., the intensity of the electric signal 222).

Control Unit

The control unit 212 includes a filter 226, a bias control unit 228, a low frequency generation unit 230, a first addition unit 229a, and a second addition unit 229b. The respective units (the filter 226, for example) of the control unit 212 are realized by the ASIC 36. This applies likewise to a control unit 312 according to a modified example and a control unit 412 according to the third embodiment, to be described below.

The bias control unit 228 applies the first bias voltage V1 (a DC voltage) to the first Mach-Zender modulator 215a via the first addition unit 229a. Further, the bias control unit 228 applies the second bias voltage V2 (a DC voltage) to the second Mach-Zender modulator 215b via the second addition unit 229b.

Further, the bias control unit 228 applies the bias voltage Vp (a DC voltage) to the phase shifting unit 215c. In the example illustrated in FIG. 6, the phase shifting unit 215c applies a phase difference between the first modulated light and the second modulated light when the bias voltage Vp is applied thereto. The applied phase difference is $\pi/2+n\pi$ (where n is an integer including zero), for example. The control unit 212 controls the first bias voltage V1 and the second bias voltage V2 by automatic bias control (ABC), for example.

For example, the low frequency generation unit 230 generates a dither signal with a frequency $f_0$ (referred to hereafter as the low-frequency signal $f_0$). The first addition unit 229a superimposes the low-frequency signal $f_0$ on the first bias voltage V1. The second addition unit 229b superimposes the low-frequency signal $f_0$ on the second bias voltage V2. The frequency $f_0$ of the low-frequency signal $f_0$ is a considerably lower frequency (for example, 1 to 1,000 kHz) than the frequency (for example, 10 GHz) at which the modulation unit 204 modulates the light 16.

The first bias voltage V1 on which the low-frequency signal $f_0$ is superimposed is applied to the first Mach-Zender modulator 215a. The second bias voltage V2 on which the low-frequency signal $f_0$ is superimposed is applied to the second Mach-Zender modulator 215b.

The low-frequency signal $f_0$ gives a low-frequency component $f_I$, which oscillates at the frequency $f_0$, to the first modulated light (in other words, the modulated light generated by the first Mach-Zender modulator 215a). Further, the low-frequency signal $f_0$ gives a low-frequency component $f_Q$, which oscillates at the frequency $f_0$, to the second modulated light (in other words, the modulated light generated by the second Mach-Zender modulator 215b). The low-frequency component $f_I$ and the low-frequency component $f_Q$ are transmitted to the corrected signal 223 via the modulated light 218 and the electric signal 222.

The filter 226 detects the low-frequency component $f_I$ and the low-frequency component $f_Q$ from the corrected signal 223 and transmits the detected components to the bias control unit 228. The bias control unit 228 controls the first bias voltage V1 so that the intensity of the low-frequency component $f_I$ from the filter 226 decreases. Further, the bias control unit 228 controls the second bias voltage V2 so that the intensity of the low-frequency component $f_Q$ from the filter 226 decreases.

As described above, the control unit 212 detects the low-frequency components $f_I$, $f_Q$, which are generated by the low-frequency signal $f_0$, from the corrected signal 223 and controls the first bias voltage V1 and the second bias voltage V2 so that the intensities of the detected low-frequency components $f_I$, $f_Q$ decrease.

Figure 10:
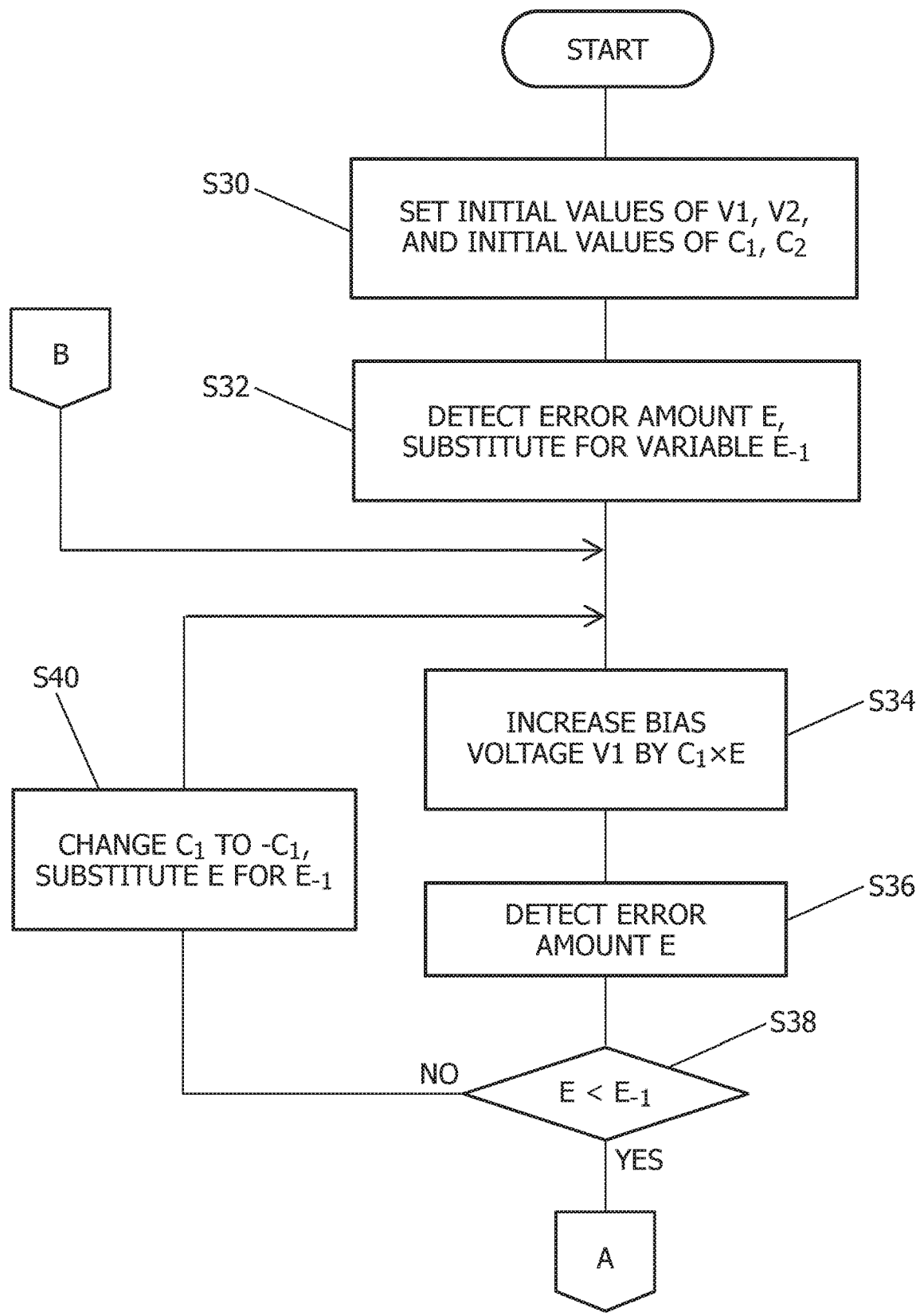
FIGS. 10 and 11 are views depicting an example of the processing executed by the bias control unit 228.
Figure 11:
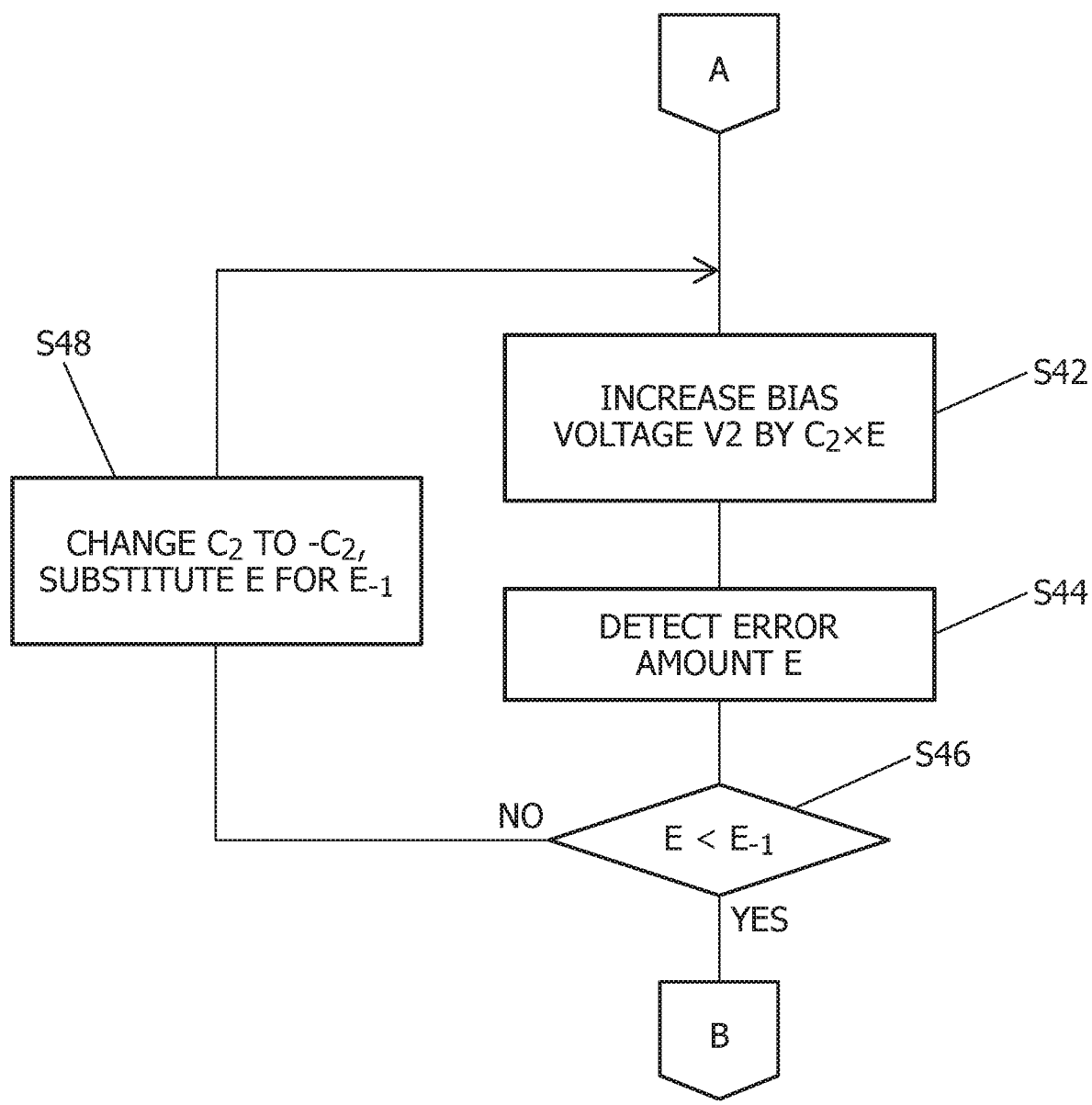

FIGS. 10 and 11 are views depicting an example of the processing executed by the bias control unit 228.

First, the bias control unit 228 sets initial values of the first bias voltage V1 and the second bias voltage V2 (step S30). Further, the bias control unit 228 sets initial values of a proportional constant $C_1$ and a proportional constant $C_2$ (step S30).

Following step S30, the bias control unit 228 detects an intensity E (referred to hereafter as an error amount) of the output signal of the filter 226 and substitutes the detected intensity E for a variable $E_{-1}$ (step S32). The filter 226 extracts a low-frequency component 227 that oscillates at the frequency $f_0$ from the corrected signal 223. The output of the filter 226 (i.e., the low-frequency component 227) includes the low-frequency component $f_I$ and the low-frequency component $f_Q$.

Following step S32, the bias control unit 228 increases the first bias voltage V1 by $C_1 \times E$ (step S34). Following step S34, the bias control unit 228 re-detects the error amount (step S36).

Following step S36, the bias control unit 228 compares the re-detected error amount E with the variable $E_{-1}$ (step S38). When the error amount E equals or exceeds the variable $E_{-1}$, the bias control unit 228 advances to step S40.

In step S40, the bias control unit 228 changes the proportional constant $C_1$ to $(-1) \times C_1$ (step S40). Further, the bias control unit 228 substitutes the error amount E detected in step S36 for the variable $E_{-1}$ (step S40). Following step S40, the bias control unit 228 returns to step S34.

Having determined in step S38 that the error amount E is smaller than the variable $E_{-1}$, the bias control unit 228 advances to step S42. In step S42, the bias control unit 228 increases the second bias voltage V2 by $C_2 \times E$.

Following step S42, the bias control unit 228 re-detects the error amount (step S44). Following step S44, the bias control unit 228 compares the re-detected error amount E with the variable $E_{-1}$ (step S46). When the error amount E equals or exceeds the variable $E_{-1}$, the bias control unit 228 advances to step S48.

In step S48, the bias control unit 228 changes the proportional constant $C_2$ to $(-1) \times C_2$ (step S48). Further, the bias control unit 228 substitutes the error amount E detected in step S44 for the variable $E_{-1}$ (step S48). Following step S48, the bias control unit 228 returns to step S42. Having determined in step S46 that the error amount E is smaller than the variable $E_{-1}$, the bias control unit 228 returns to step S34.

By repeating steps S34 to S40, the intensity of the low-frequency component $f_I$ decreases. The low-frequency component $f_I$ continues to decrease until the intensity of the low-frequency component $f_I$ reaches the vicinity of a minimum value thereof. As a result, the first bias voltage V1 reaches the vicinity of a null point of the first Mach-Zender modulator 215a. The first bias voltage V1 is held as is in the vicinity of the null point. The null point is the applied voltage (the DC voltage) at which the intensity of the light output from a modulator is minimized when a drive signal is not input to the modulator.

By repeating steps S42 to S48, the intensity of the low-frequency component $f_Q$ decreases. The low-frequency component $f_Q$ continues to decrease until the intensity of the low-frequency component $f_Q$ reaches the vicinity of a minimum value thereof. As a result, the second bias voltage V2 reaches the vicinity of the null point of the second Mach-Zender modulator 215b. The second bias voltage V2 is held as is in the vicinity of the null point. When the first bias voltage V1 and the second bias voltage V2 both reach the vicinity of the null points, the first bias voltage V1 and the second bias voltage V2 are optimized. For example, in a case where the amplitude of the drive voltage is $2V_\pi$, the intensity of the modulated light 218 is maximized when the first bias voltage V1 and the second bias voltage V2 both reach the vicinity of the null points. $V_\pi$ is a half-wave voltage (the width of applied-voltage range in which optical output of an MZ modulator ranges from the maximum to the minimum in the applied voltage vs optical output characteristic of the MZ modulator).

The proportional constant $C_1$ and the proportional constant $C_2$ are set so that when a product (=a1×a2) of the optical amplification factor a1 of the optical amplifier 38 and the amplification factor a2 of the electric amplifier 44 takes a specific value A (referred to hereafter as the optimum value A), bias control is performed with maximum efficiency. In the following description, the product of the optical amplification factor a1 and the amplification factor a2 will be referred to as the loop gain.

When the target value of the amplified light 220 is changed, the optical amplifier 38 changes the optical amplification factor a1 in order to realize the change of the target value. When the amplification factor a2 of the electric amplifier 44 is not corrected in response to the change of the optical amplification factor a1 of the optical amplifier 38, the loop gain (a1×a2) changes in response to change of the optical amplification factor a1 by the optical amplifier 38. As a result, the loop gain diverges from the optimum value A, making it difficult to efficiently control the first bias voltage V1 and the second bias voltage V2.

According to the example described with reference to FIG. 8 and so on, however, in steps S24 to S28, the loop gain is held at the optimum value A even when the target value of the amplified light 220 is changed. Hence, the first bias voltage V1 and the second bias voltage V2 are efficiently controlled even when the target value of the amplified light 220 is changed.

The control of the first bias voltage V1 and the second bias voltage V2 illustrated in FIGS. 10 and 11 is proportional control. However, different control may be used to control the first bias voltage V1 and the second bias voltage V2. For example, the control of the first bias voltage V1 and the second bias voltage V2 may be proportional integral differential (PID) control.

In the control illustrated in FIGS. 10 and 11, the first bias voltage V1 and the second bias voltage V2 are held in the vicinity of the null point. However, the first bias voltage V1 and the second bias voltage V2 may be held at an operating point other than the null point (for example, the bias voltage at which the modulated light is maximized).

In the control illustrated in FIGS. 10 and 11, the bias voltage Vp of the phase shifter 215c is not controlled. However, the bias voltage Vp of the phase shifter 215c may also be controlled (see Japanese Patent Application Publication No. 2018-54907, for example).

In FIGS. 10 and 11, steps S34 to S40 are executed before steps S42 to S48. However, steps S42 to S48 may be executed before steps S34 to S40.

According to the optical transmission apparatus 202 described with reference to FIG. 5 and so on, deterioration of a transmission signal resulting from bias control of a modulator that modulates light by QPSK can be prevented.

(3) Modified Example

Figure 12:
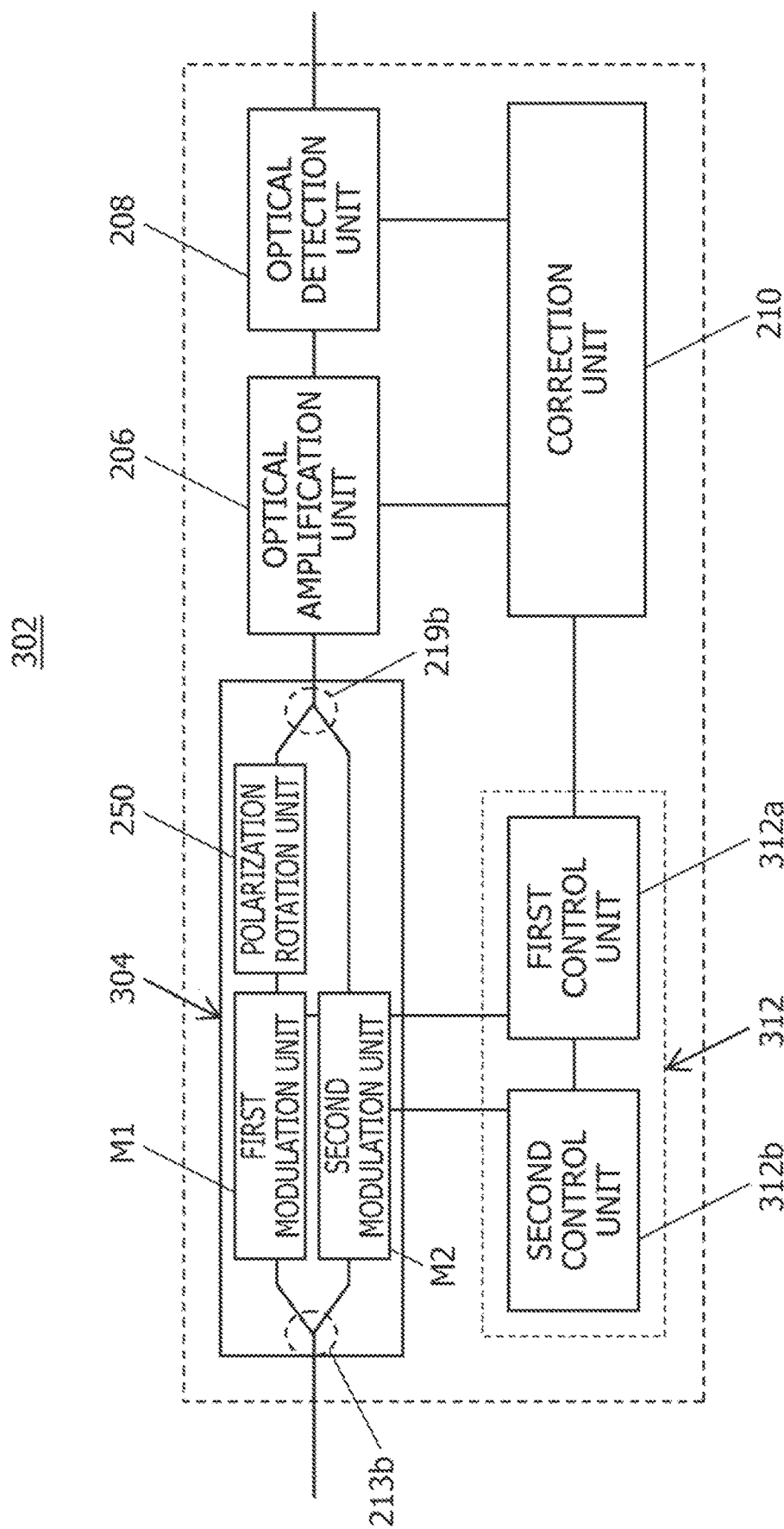
FIG. 12 depicts an example of function blocks of an optical transmission apparatus 302 according to a modified example.
Figure 13:
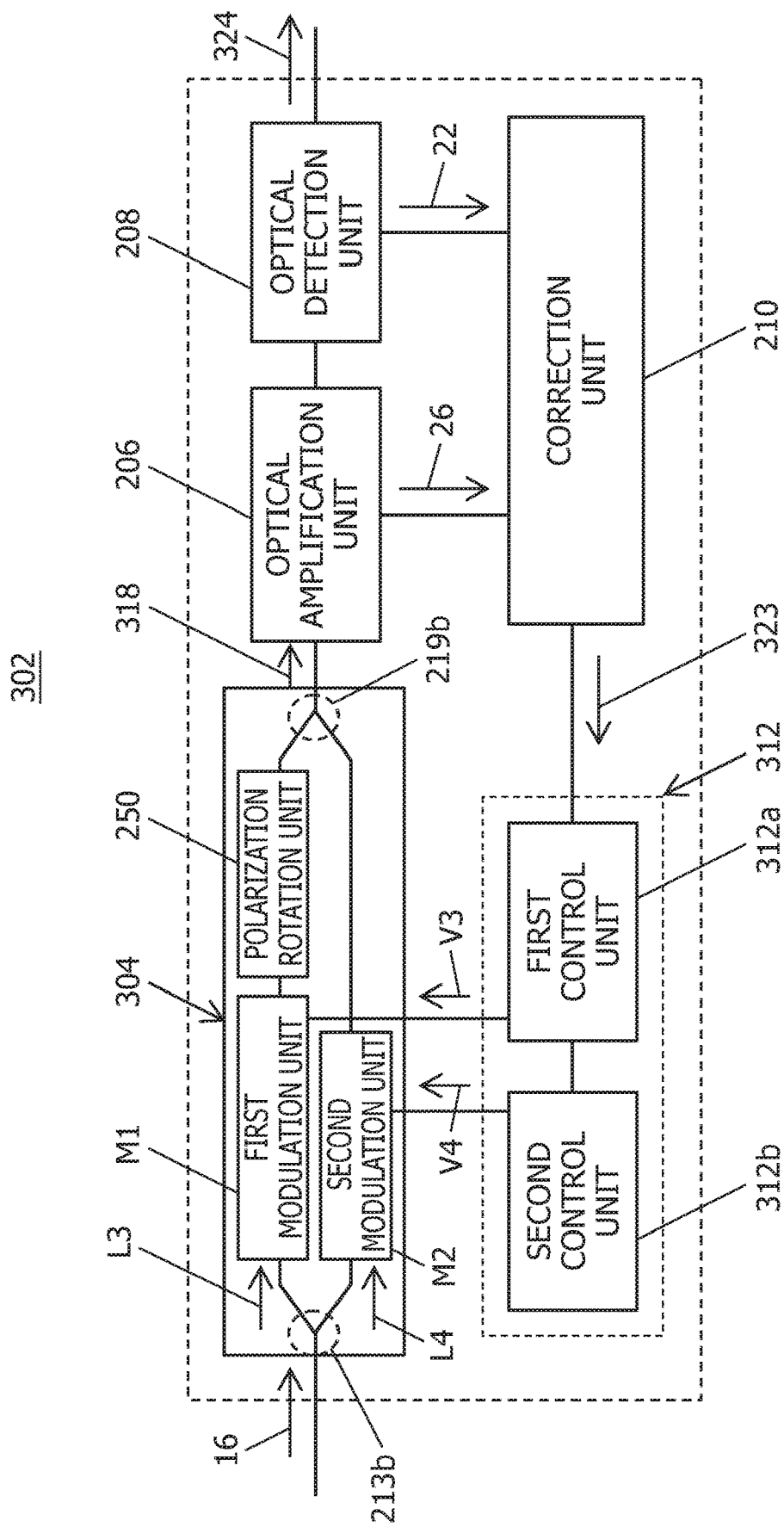
FIG. 13 is a view illustrating an operation of the optical transmission apparatus 302 of the modified example.

FIG. 12 depicts an example of function blocks of an optical transmission apparatus 302 according to a modified example. FIG. 13 is a view illustrating an operation of the optical transmission apparatus 302 of the modified example. The modulation unit 204 of the optical transmission apparatus 202, described with reference to FIG. 5, modulates the light 16 by QPSK. A modulation unit 304 depicted in FIG. 12, on the other hand, modulates the light 16 (see FIG. 13) by dual polarization-quadrature phase shift keying (DP-QPSK).

The modulation unit 304 of FIG. 12 includes, for example, a second dividing unit 213b, a first modulation unit M1, and a second modulation unit M2. The modulation unit 304 further includes a second multiplexing unit 219b and a polarization rotation unit 250. The second dividing unit 213b and the second multiplexing unit 219b are Y-branch waveguides, for example. The modulation unit 304 is a Mach-Zender modulator. For example, the first modulation unit M1 and the second modulation unit M2 are modulators having the same structure as the modulation unit 204 described with reference to FIG. 5 and so on. The modulation unit 304 is an example of the modulation unit 4 (see FIG. 1) of the first embodiment.

The second dividing unit 213b generates third light L3 and fourth light L4 by dividing the light 16 (see FIG. 13). In the example depicted in FIG. 13, the light 16 is supplied from the exterior of the optical transmission apparatus 302.

The first modulation unit M1 generates third modulated light by modulating the third light L3 while a third bias voltage V3 on which a first low-frequency signal $f_1$ is superimposed is applied to the first modulation unit M1. The first low-frequency signal $f_1$ is superimposed on the third bias voltage V3 repeatedly. In other words, the first low-frequency signal $f_1$ is superimposed on the third bias voltage V3 intermittently.

The second modulation unit M2 generates fourth modulated light by modulating the fourth light while a fourth bias voltage V4 on which a second low-frequency signal $f_2$ is superimposed is applied to the second modulation unit M2. The second low-frequency signal $f_2$ is superimposed on the fourth bias voltage V4 in the intervals between the repeated superimposition of the first low-frequency signal $f_1$ on the third bias voltage V3. In other words, the biases of the modulation unit 304 are voltages on which the first low-frequency signal $f_1$ and the second low-frequency signal $f_2$ are superimposed in a time-divided manner. The second low-frequency signal $f_2$ has the same frequency as the first low-frequency signal $f_1$, for example.

The optical transmission apparatus 302 is an example of the optical transmission apparatus 2 (see FIG. 1) described in the first embodiment. The bias 14 (see FIG. 2) of the first embodiment includes the third bias voltage V3 on which the first low-frequency signal $f_1$ is intermittently superimposed and the fourth bias voltage V4 on which the second low-frequency signal $f_2$ is intermittently superimposed, for example. The low-frequency signal of the first embodiment includes the first low-frequency signal $f_1$ and the second low-frequency signal $f_2$, for example.

The polarization rotation unit 250 changes the polarization direction of the third modulated light. More specifically, the polarization rotation unit 250 rotates the polarization direction of the third modulated light by 90°. The polarization rotation unit 250 is an optical element including a quarter-wave plate and a half-wave plate, for example.

The second multiplexing unit 219b generates modulated light 318 by multiplexing the third modulated light with the changed polarization direction and the fourth modulated light.

The optical amplification unit 206, the optical detection unit 208, and the amplification unit 210 are the units described with reference to FIG. 5 and so on. The optical amplification unit 206, the optical detection unit 208, and the amplification unit 210 cooperate to generate a corrected signal 323 from the modulated light 318.

The control unit 312 includes a first control unit 312a and a second control unit 312b. The first control unit 312a detects the first low-frequency component generated by the first low-frequency signal $f_1$ from the corrected signal 323, and controls the third bias voltage V3 on the basis of the detected first low-frequency component. The second control unit 312b detects the second low-frequency component generated by the second low-frequency signal $f_2$ from the corrected signal 323, and controls the fourth bias voltage V4 on the basis of the detected second low-frequency component. The control unit 312 is an example of the control unit 12 described in the first embodiment.

As described above, the first low-frequency signal $f_1$ and the second low-frequency signal $f_2$ are superimposed on the biases of the modulation unit 304 in a time-divided manner (alternately, for example). As a result, the first low-frequency component and the second low-frequency component can be detected separately even when the frequency of the first low-frequency signal $f_1$ and the frequency of the second low-frequency signal $f_2$ are identical. Note, however, that the first low-frequency signal $f_1$ and the second low-frequency signal $f_2$ may have separate frequencies.

According to the optical transmission apparatus 302 of FIG. 13, deterioration of a transmission signal resulting from bias control of a modulator that modulates light by DP-QPSK can be prevented.

With the optical transmission apparatus according to the second embodiment, deterioration due to bias control of a transmission signal during digital coherent communication such as QPSK or DP-QPSK can be prevented.

Third Embodiment

The third embodiment is similar to the second embodiment. Therefore, description of configurations and so on that are identical to the second embodiment will be either omitted or simplified.

With the optical transmission apparatus according to the third embodiment, a high-quality transmission signal 24 in which intensity variation is suppressed can be transmitted at the same time as output of the transmission signal 24 is started or restarted.

The hardware configuration of the optical transmission apparatus according to the third embodiment is substantially identical to the hardware configuration of the second embodiment, described with reference to FIG. 4. Note, however, that a modulator 434 (see FIG. 4) of the third embodiment includes an optical detector (referred to hereafter as a monitor) that detects light (referred to hereafter as emission light) emitted from the first multiplexing unit 219a (see FIG. 5). An ASIC 436 (see FIG. 4) of the third embodiment is configured to be capable of receiving the output (referred to hereafter as a monitoring signal) of the monitor.

Figure 14:
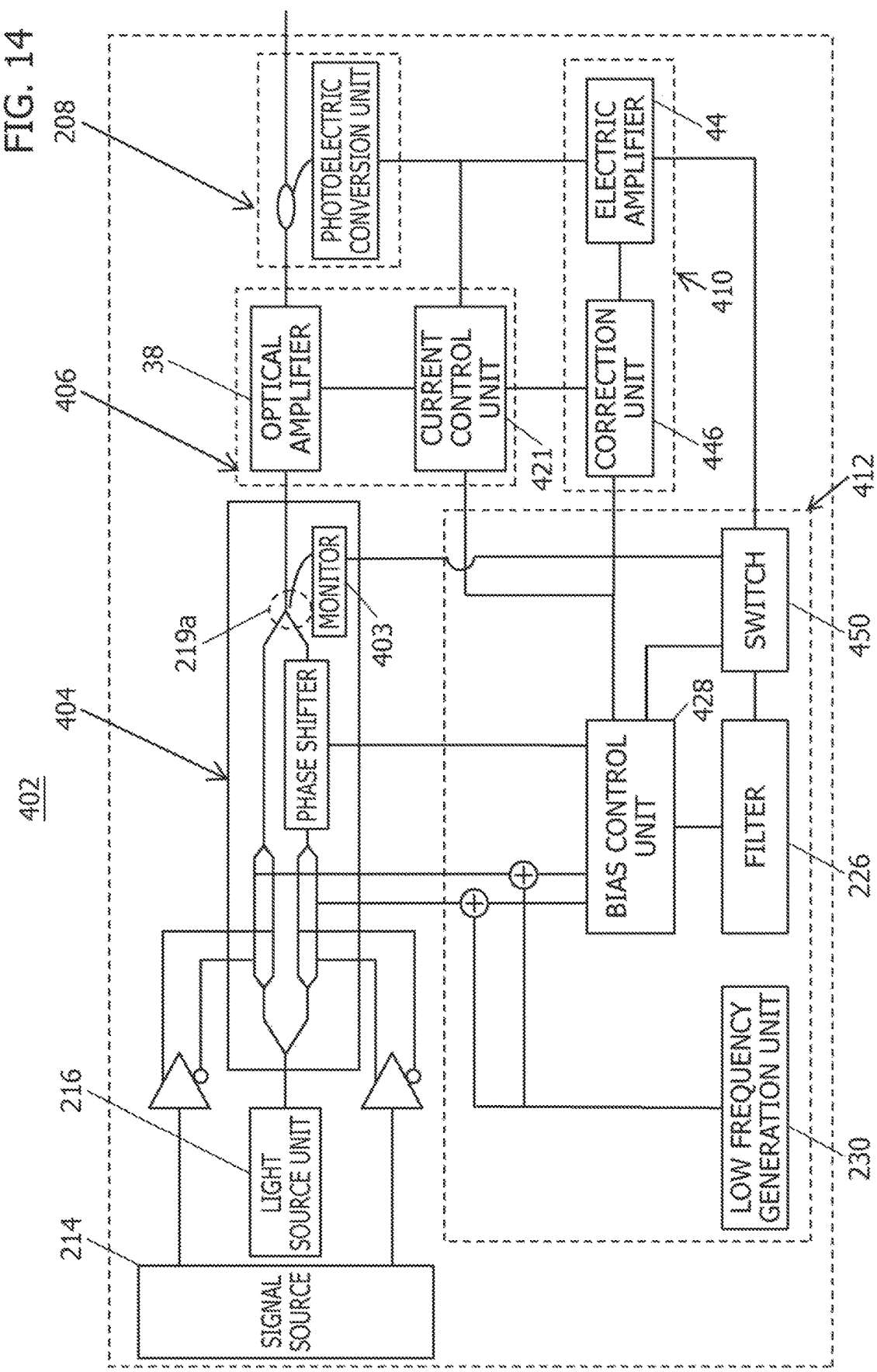
FIG. 14 depicts an example of function blocks of an optical transmission apparatus 402 according to the third embodiment.
Figure 15:
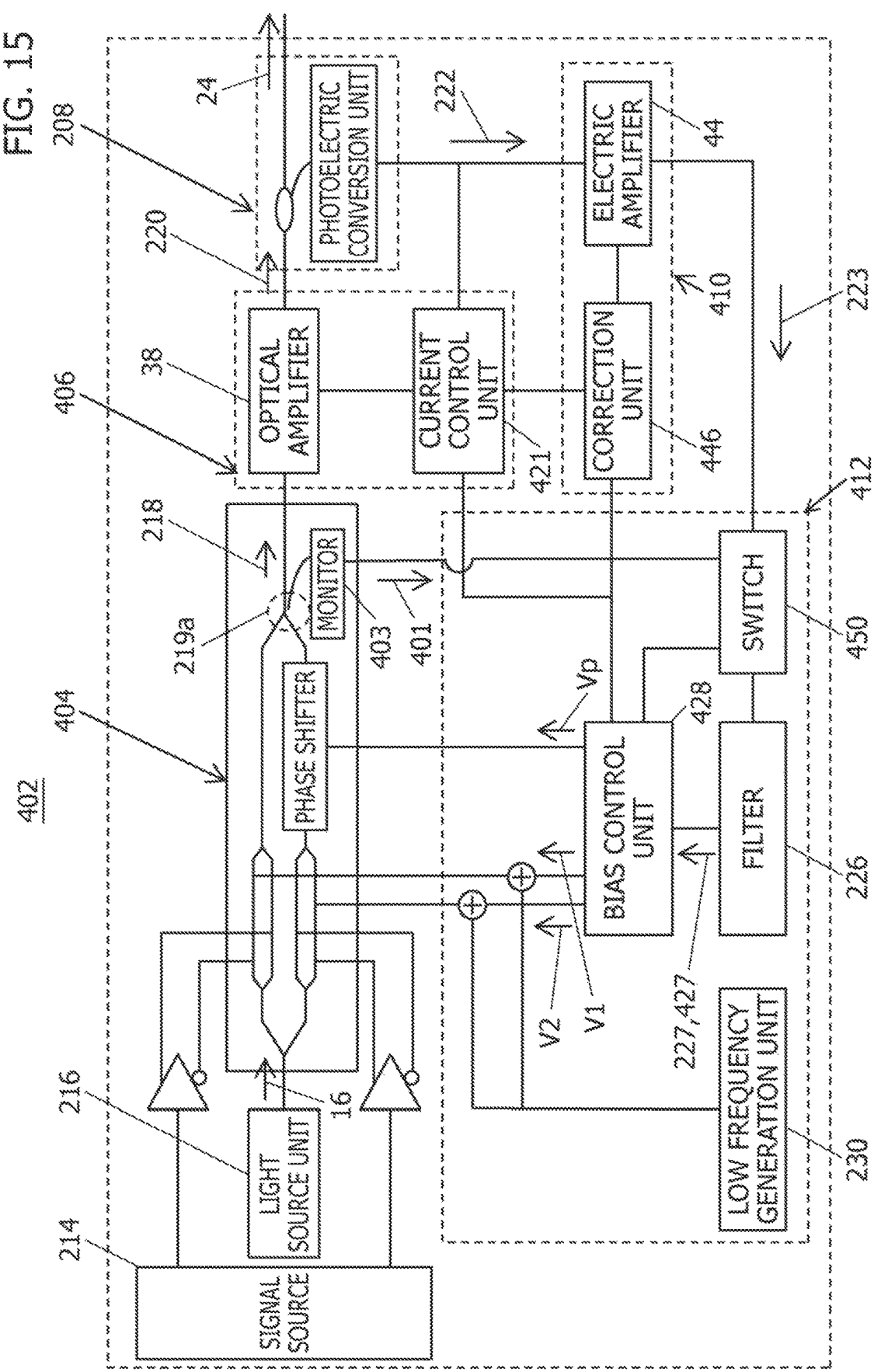
FIG. 15 is a view illustrating an operation of the optical transmission apparatus 402 according to the third embodiment.

FIG. 14 depicts an example of function blocks of an optical transmission apparatus 402 according to the third embodiment. Some of the units (the modulation unit 404, an optical amplification unit 406, an amplification unit 410, and a control unit 412) included in the optical transmission apparatus 402 of the third embodiment are similar to the units included in the optical transmission apparatus 202 of the second embodiment. The remainder of the units (the optical detection unit 208 and so on) included in the optical transmission apparatus 402 of the third embodiment are substantially identical to the units included in the optical transmission apparatus 202 of the second embodiment. FIG. 15 is a view illustrating an operation of the optical transmission apparatus 402 according to the third embodiment.

Modulation Unit

The configuration and operation of the modulation unit 404 are substantially identical to the configuration of the modulation unit 204 of the second embodiment. Note, however, that the modulation unit 404 includes a monitor 403 that generates a monitoring signal 401 by performing photoelectric conversion on the emission light emitted from the first multiplexing unit 219a. The emission light is a part of the light 16 from the light source unit 216.

Control Unit

The configuration of the control unit 412 is substantially identical to the configuration of the control unit 212 (see FIG. 5) of the second embodiment. Note, however, that the control unit 412 includes a switch 450.

The control unit 412 detects a low-frequency component 427 (referred to hereafter as another low-frequency component) generated by the low-frequency signal $f_0$ (see the second embodiment) from the monitoring signal 401 of the modulation unit 404. The control unit 412 adjusts the bias of the modulation unit 404 on the basis of the another low-frequency component 427 and thereafter starts the control of the bias based on the low-frequency component 227 (see the second embodiment) of the corrected signal 223. For example, the frequency of the another low-frequency component 427 is the frequency $f_0$ of the low-frequency signal $f_0$ generated by the low frequency generation unit 230. While the control unit 412 adjusts the bias of the modulation unit 404, the bias of the modulation unit 404 is adjusted so that the intensity of the another low-frequency component 427 decreases.

The operation of the low frequency generation unit 230 is substantially identical to the operation described in the second embodiment. The filter 226 executes the operation described in the second embodiment. In addition, the filter 226 detects the another low-frequency component 427 from the monitoring signal 401.

When the optical transmission apparatus 402 is activated, the light source unit 216 starts to output the light 16. The control unit 412 starts to adjust the bias of the modulation unit 404 on the basis of the monitoring signal 401. The optical amplifier 38 starts to amplify the modulated light 218 and hold the intensity of the amplified light 220 after bias adjustment based on the monitoring signal 401 is complete.

Figure 16:
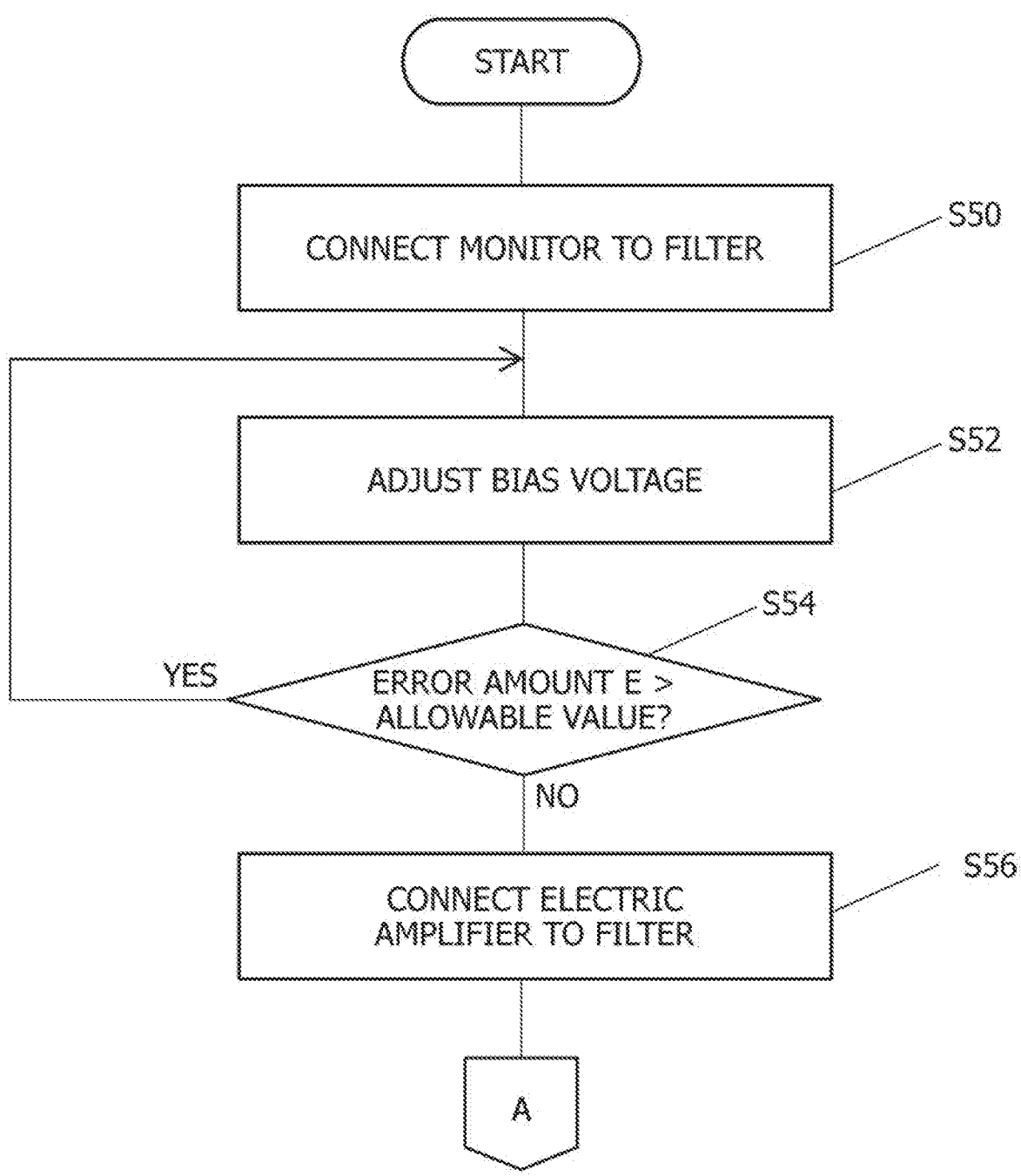
FIGS. 16 and 17 are views depicting an example of the processing executed by a bias control unit 428.
Figure 17:
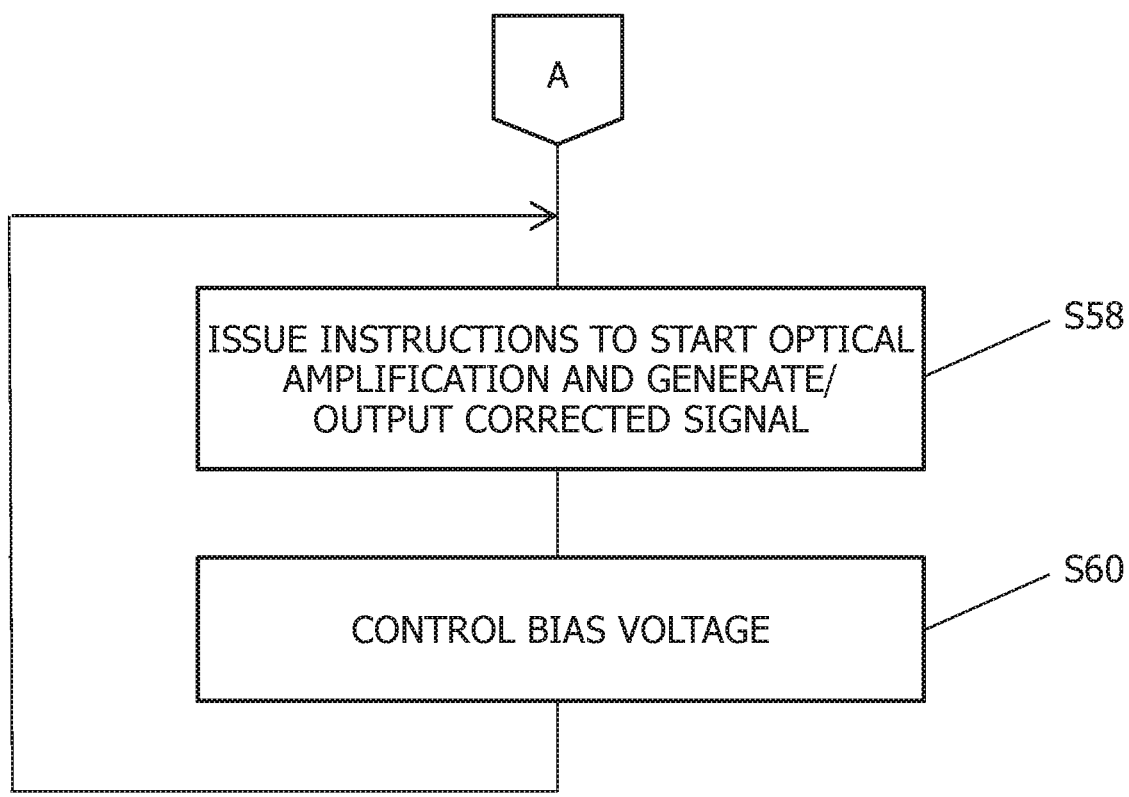

FIGS. 16 and 17 are views depicting an example of the processing executed by a bias control unit 428.

When the optical transmission apparatus 402 is activated, first, the bias control unit 428 connects the monitor 403 to the filter 226 by controlling the switch 450 (step S50).

Following step S50, the bias control unit 428 adjusts the bias of the modulation unit 404 (step S52). The filter 226, when connected to the monitor 403 in step S50, detects the another low-frequency component 427 from the monitoring signal 401. The bias control unit 428 detects the intensity E (i.e., the error amount) of the another low-frequency component 427 and adjusts the bias of the modulation unit 404 on the basis of the detected error amount.

The adjustment procedure is substantially identical to the bias control procedure of the second embodiment, described with reference to FIGS. 10 and 11. Note, however, that when the error amount E is determined to be smaller than the variable $E_{-1}$ in step S46 (see FIG. 11), the bias control unit 428 advances to step S54 (see FIG. 16) rather than step S34 (see FIG. 10).

After advancing to step S54, the bias control unit 428 determines whether or not the most recently detected error amount E is larger than an allowable value (step S54). When the error amount E is larger than the allowable value, the bias control unit 428 returns to step S52. At this time, the bias control unit 428 skips steps S30 to S32 (see FIG. 10) and executes the processing from step S34.

When the error amount E is equal to or smaller than the allowable value, the bias control unit 428 advances to step S56. After advancing to step S56, the bias control unit 428 disconnects the monitor 403 from the filter 226 by controlling the switch 450. Further, the bias control unit 428 connects the electric amplifier 44 to the filter 226 (step S56).

Following step S56, the bias control unit 428 instructs the optical amplification unit 406 to begin optical amplification (step S58). Further, the bias control unit 428 instructs the amplification unit 410 to generate and output the corrected signal 223 (step S58). To ensure that generation of the corrected signal 223 starts after the start of optical amplification, the instruction to the amplification unit 410 is issued after the instruction to the optical amplification unit 406 is issued, for example.

Following step S58, the bias control unit 428 starts to control the bias voltages V1, V2 (step S60). The bias voltage control procedure was described with reference to FIGS. 10 and 11.

Optical Amplification Unit

Figure 18:
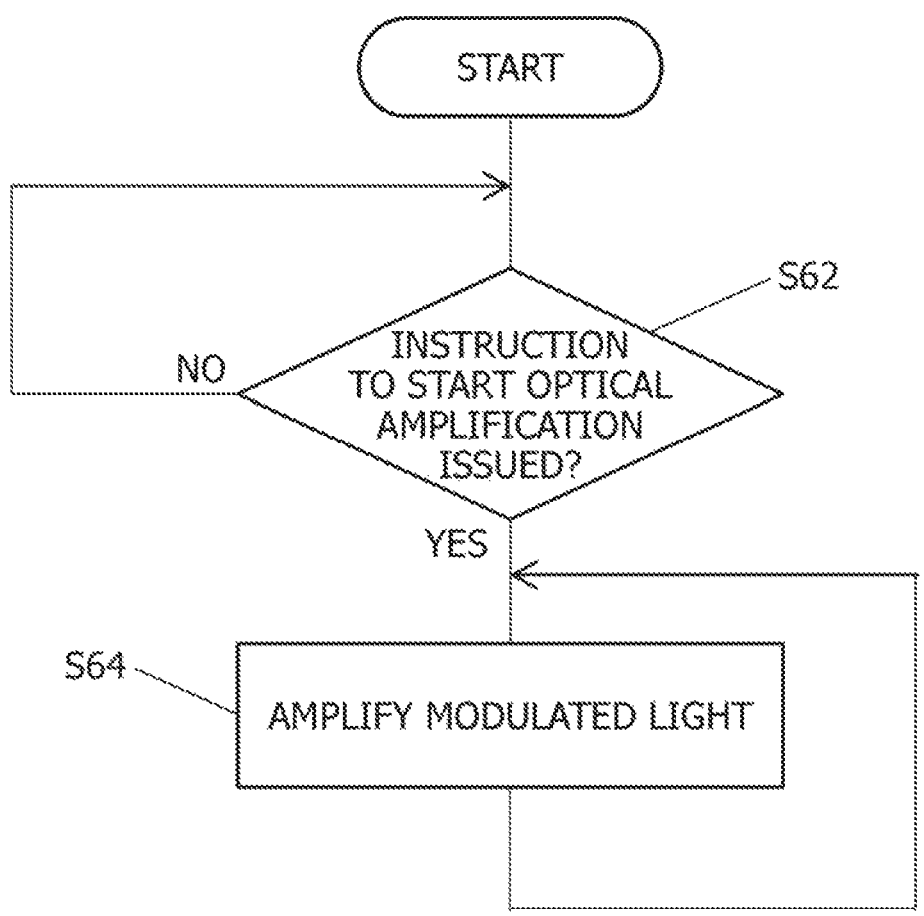
FIG. 18 is a view depicting an example of the processing executed by the optical amplification unit 406.

Once adjustment of the bias voltages V1, V2 in accordance with the monitoring signal 401 is complete, the optical amplification unit 406 starts to amplify the modulated light 218 and holds the intensity of the amplified light 220 at the target value while generating the amplified light 220. FIG. 18 is a view depicting an example of the processing executed by the optical amplification unit 406.

When the optical transmission apparatus 402 is activated, the optical amplification unit 406 determines whether or not an instruction to begin optical amplification has been received from the bias control unit 428 (step S62). When an instruction has not been received, the optical amplification unit 406 executes step S62 again.

When an instruction has been received, the optical amplification unit 406 advances to step S64. In step S64, the optical amplification unit 406 starts to amplify the modulated light 218 and generates the amplified light 220 while holding the intensity of the amplified light 220 at the target value.

Step S62 is executed by the current control unit 421, for example. Step S64 following step S62 is executed by the current control unit 421 and the optical amplifier 38.

Amplification Unit

Figure 19:
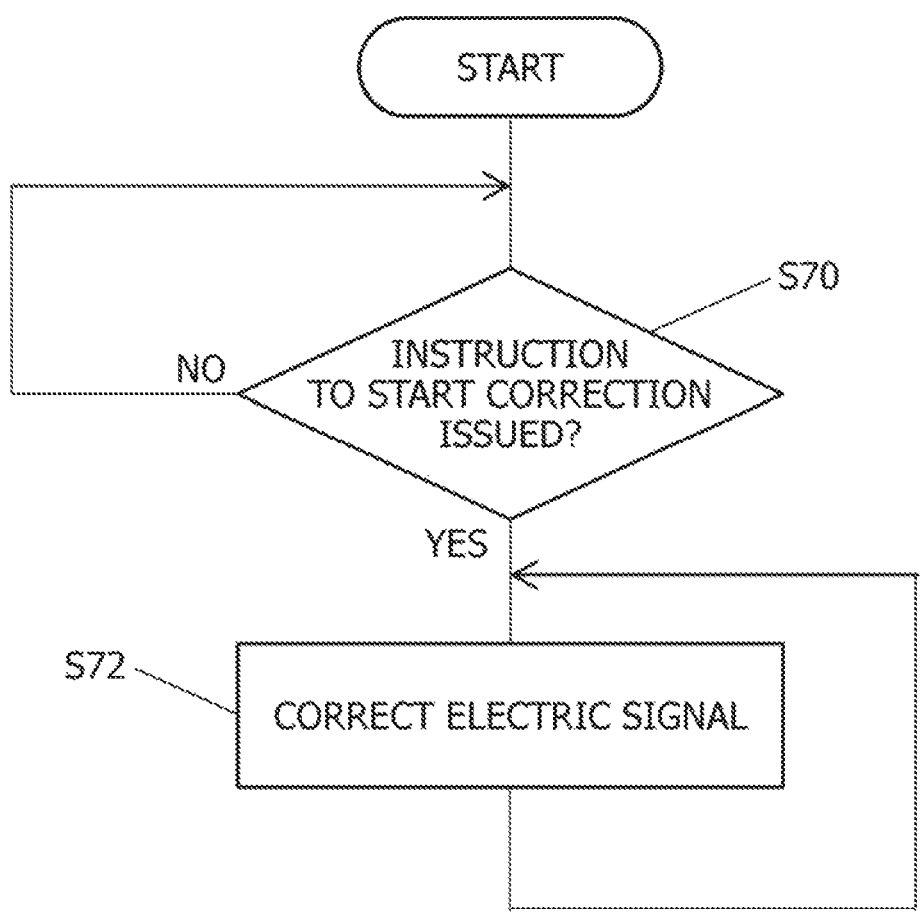
FIG. 19 is a view depicting an example of the processing executed by the amplification unit 410.

After starting to amplify the modulated light 218, the amplification unit 410 starts to suppress variation in the amplified signal 223 (in other words, the amplified electric signal) due to change of the target value for the intensity of the amplified modulated light 218 (i.e., the amplified light 220). FIG. 19 is a view depicting an example of the processing executed by the amplification unit 410.

When the optical transmission apparatus 402 is activated, the amplification unit 410 determines whether or not an instruction to start generating and outputting the corrected signal 223 has been received from the bias control unit 428. In other words, the amplification unit 410 determines whether or not an instruction to start correcting the electric signal 222 has been received (step S70). When an instruction has not been received, the amplification unit 410 executes step S70 again.

When an instruction has been received, the amplification unit 410 advances to step S72. In step S72, the amplification unit 410 starts to generate and output the corrected signal 223. In other words, the amplification unit 410 starts to correct the electric signal 222 (step S72). Correction of the electric signal 222 is then continued.

Step S70 is executed by the correction unit 446, for example. Step S72 following step S70 is executed by the correction unit 446 and the electric amplifier 44.

In most cases, the bias voltages V1, V2 are out of the optimum values immediately after the optical transmission apparatus 402 is activated. The modulated light 218 generated in this state is of low quality. Therefore, the optical transmission apparatus 402 according to the third embodiment first causes the bias voltages V1, V2 to roughly approach the optimum values by adjusting the bias voltages V1, V2 using the monitoring signal 401.

Once adjustment of the bias voltages V1, V2 is complete, the optical transmission apparatus 402 starts to amplify the modulated light 218, and outputs the transmission signal 24. Substantially simultaneously, the optical transmission apparatus 402 starts to perform photoelectric conversion on a part of the amplified modulated light 218 (i.e., the amplified light 220), and starts to control the bias voltages V1, V2 on the basis of the electric signal 222 generated by the photoelectric conversion. As a result of this control, the bias voltages V1, V2 substantially coincides with the optimum values.

Hence, with the optical transmission apparatus 402 according to the third embodiment, the transmission signal 24 can be transmitted in a high-quality state shortly after the start of output of the transmission signal 24. Due to the characteristics of the emission light (the light emitted from the first multiplexing unit 219a), it is difficult to substantially make the bias voltages V1, V2 coincide with the optimum values thereof by adjusting the bias voltages V1, V2 using the monitoring signal 401. Therefore, after starting optical amplification, the optical transmission apparatus 402 according to the third embodiment controls the bias voltages V1, V2 on the basis of the electric signal 222 acquired by performing photoelectric conversion on a part of the amplified light 220.

Control During Shutdown

The optical transmission apparatus 402 may temporarily stop (in other words, shut down) output of the transmission signal 24 in response to a request from the outside, for example, after starting to output the transmission signal 24. By continuing to adjust the bias voltages V1, V2 even during a shutdown, the optical transmission apparatus 402 can transmit the transmission signal 24 in a high-quality state immediately after resuming output of the transmission signal 24.

When output of the transmission signal 24 is stopped in response to a request from the outside, for example, the optical transmission apparatus 402 starts the process described with reference to FIGS. 16 to 19. Note, however, that in step S54 (see FIG. 16), a determination is made as to whether or not an instruction to resume output of the transmission signal 24 has been received. When an instruction to resume output has not been received, the bias control unit 428 returns to step S52. When an instruction to resume output has been received, the bias control unit 428 advances to step S56.

In the example described with reference to FIG. 15 and so on, the optical amplification unit 406 and the amplification unit 410 execute the processing for the activation in response to an instruction from the control unit 412 (more specifically, the bias control unit 428). However, the processing for the activation may be executed on the basis of an instruction from a unit other than the control unit 412. For example, the processing for the activation may be executed in response to an instruction from a unit not illustrated in FIG. 15. This applies likewise to the processing performed when transmission is resumed following a shutdown.

In the third embodiment, as described above, the bias voltages are adjusted on the basis of the monitoring signal 401 before transmission of the transmission signal 24 is started or resumed. According to the third embodiment, therefore, the transmission signal 24 can be transmitted in a high-quality state at the same time as output of the transmission signal 24 is started or resumed.

Several embodiments of the present invention are described above, but the present invention is not limited to these embodiments and may be subjected to various amendments. For example, the modulation units 4, 204, 304, 404 of the embodiments modulate light by changing a voltage, but the modulation units 4, 204, 304, 404 may modulate light by changing a current. In this case, the bias of the modulation unit is a current (in other words, a bias current).

In the examples described above, the transmission signal 24 is an optical signal used in digital coherent communication. However, the transmission signal 24 may be an optical signal used in multi-valued amplitude modulation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed:

1. An optical transmission apparatus comprising:
    a modulation unit configured to generate modulated light by modulating light while at least one bias on which a low-frequency signal is superimposed is applied to the modulation unit;
    an optical amplification unit configured to generate amplified light by amplifying the modulated light while holding an intensity of the amplified light at a target value, the target value being changeable;
    an optical detection unit configured to generate an electric signal by performing photoelectric conversion on a part of the amplified light;
    an amplification unit configured to amplify the electric signal while suppressing variation in the amplified electric signal by controlling the amplifying of the electric signal, the variation in the amplified electric signal being due to a change of the target value; and
    a control unit configured to detect a low-frequency component from the amplified electric signal the variation of which is suppressed and control the at least one bias on a basis of the detected low-frequency component, the low-frequency component being generated by the low-frequency signal.

2. The optical transmission apparatus according to claim 1, wherein the control unit is configured to control the at least one bias so that an intensity of the low-frequency component decreases.

3. The optical transmission apparatus according to claim 1, wherein the control unit is configured to detect another low-frequency component from a monitoring signal acquired by performing photoelectric conversion on emission light emitted from the modulation unit, the emission light being a part of the light, and adjust the at least one bias on a basis of the detected another low-frequency component, and then start the controlling of the at least one bias on a basis of the detected low-frequency component, the another low-frequency component being generated by the low-frequency signal and
    the optical amplification unit is configured to start the amplifying of the modulated light and the holding of the intensity of the amplified light after the adjusting of the at least one bias is complete.

4. The optical transmission apparatus according to claim 3, wherein, in the adjusting of the at least one bias, the at least one bias is adjusted so that an intensity of the another low-frequency component decreases.

5. The optical transmission apparatus according to claim 1, wherein the modulation unit includes: a first dividing unit that generates first light and second light by dividing the light; a first Mach-Zender modulator that generates first modulated light by modulating the first light while a first bias included in the at least one bias is applied to the first Mach-Zender modulator; a second Mach-Zender modulator that generates second modulated light by modulating the second light while a second bias included in the at least one bias is applied to the second Mach-Zender modulator; a phase shifting unit that varies a phase of the second modulated light by a certain amount; and a first multiplexing unit that generates the modulated light by multiplexing the first modulated light and the second modulated light the phase of which is changed therebefore.

6. The optical transmission apparatus according to claim 1, wherein the modulation unit includes: a second dividing unit that generates third light and fourth light by dividing the light; a first modulation unit that generates third modulated light by modulating the third light while a third bias is applied to the first modulation unit, a first low-frequency signal being repeatedly superimposed on the third bias; a second modulation unit that generates fourth modulated light by modulating the fourth light while a fourth bias is applied to the second modulation unit, a second low-frequency signal being superimposed on the fourth bias in intervals between repeated superimposition of the first low-frequency signal on the third bias; a polarization rotation unit that changes a polarization direction of the third modulated light; and a second multiplexing unit that generates the modulated light by multiplexing the fourth modulated light and the third modulated light the polarization direction of which is changed therebefore, the at least one bias includes the third bias and the fourth bias, the low-frequency signal includes the first low-frequency signal and the second low-frequency signal, and the control unit includes: a first control unit that detects a first low-frequency component from the amplified electric signal the variation of which is suppressed and controls the third bias on a basis of the detected first low-frequency component, the first low-frequency component being generated by the first low-frequency signal; and a second control unit that detects a second low-frequency component from the amplified electric signal the variation of which is suppressed and controls the fourth bias on a basis of the detected second low-frequency component, the second low-frequency component being generated by the second low-frequency signal.

7. The optical transmission apparatus according to claim 1, wherein a frequency of the low-frequency signal is lower than a frequency at which the modulation unit modulates the light.

8. A bias control method comprising:

generating modulated light by modulating light using a modulator to which a bias is applied, a low-frequency signal being superimposed on the bias;

generating amplified light by amplifying the modulated light while holding an intensity of the amplified light at a target value that is changeable;

generating an electric signal by performing photoelectric conversion on a part of the amplified light;

amplifying the electric signal while suppressing variation in the amplified electric signal by controlling the amplifying of the electric signal, the variation in the amplified electric signal being due to a change of the target value; and detecting a low-frequency component from the amplified electric signal the variation of which is suppressed and controlling the bias on a basis of the detected low-frequency component, the low-frequency component being generated by the low-frequency signal.

* * * * *